United States Patent
Botinha et al.

(10) Patent No.: US 12,195,827 B2
(45) Date of Patent: Jan. 14, 2025

(54) NICKEL ALLOY HAVING GOOD RESISTANCE TO CORROSION AND HIGH TENSILE STRENGTH, AND METHOD FOR PRODUCING SEMI-FINISHED PRODUCTS

(71) Applicant: VDM Metals International GmbH, Werdohl (DE)

(72) Inventors: Julia Botinha, Hagen (DE); Bodo Gehrmann, Plettenberg (DE); Helena Alves, Dortmund (DE)

(73) Assignee: VDM Metals International GmbH, Werdohl (DE)

( * ) Notice: Subject to any disclaimer, the term of this patent is extended or adjusted under 35 U.S.C. 154(b) by 685 days.

(21) Appl. No.: 17/422,069

(22) PCT Filed: Mar. 17, 2020

(86) PCT No.: PCT/DE2020/100210
§ 371 (c)(1),
(2) Date: Jul. 9, 2021

(87) PCT Pub. No.: WO2020/187368
PCT Pub. Date: Sep. 24, 2020

(65) Prior Publication Data
US 2022/0098704 A1 Mar. 31, 2022

(30) Foreign Application Priority Data

Mar. 18, 2019 (DE) .................... 10 2019 106 776.6
Mar. 10, 2020 (DE) .................... 10 2020 106 433.0

(51) Int. Cl.
*C22C 19/05* (2006.01)
*B22F 1/05* (2022.01)
(Continued)

(52) U.S. Cl.
CPC .................. *C22C 1/02* (2013.01); *B22F 1/05* (2022.01); *B22F 1/065* (2022.01); *B22F 9/082* (2013.01);
(Continued)

(58) Field of Classification Search
None
See application file for complete search history.

(56) References Cited

U.S. PATENT DOCUMENTS 3,046,108 A 7/1962 Eiselstein
3,160,500 A 12/1964 Eiselstein
(Continued)

FOREIGN PATENT DOCUMENTS

CN 107041147 A 8/2017
DE 44 36 670 C2 11/2002
(Continued)

OTHER PUBLICATIONS

Choi et al., "Densification and microstructural investigation of Inconel 718 parts fabricated by selective laser melting", Elsevier, Powder Technology 310 (2017) pp. 60-66.
(Continued)

*Primary Examiner* — George Wyszomierski
(74) *Attorney, Agent, or Firm* — Collard & Roe, P.C.

(57) ABSTRACT

A nickel alloy includes (in wt. %) Ni 50-55%, Cr 17-21%, Mo>0-9%, W 0-9%, Nb 1-5.7%, Ta>0-4.7%, Ti 0.1-3.0%, Al 0.4-4.0%, Co max. 3.0%, Mn max. 0.35%, Si max. 0.35%, Cu max. 0.23%, C 0.001-0.045%, S max. 0.01%, P 0.001-0.02%, B 0.001-0.01%, the remainder Fe and the conventional process-related impurities, wherein the following relations are provided: Nb+Ta 1-5.7% (1), Al+Ti>1.2-5% (2), Mo+W 3-9% (3), where Nb, Ta, Al and Ti are the concentration of the elements in question in wt. %.

10 Claims, 19 Drawing Sheets

(51) Int. Cl.
  *B22F 1/065*   (2022.01)
  *B22F 9/08*    (2006.01)
  *C22C 1/02*    (2006.01)
  *C22F 1/10*    (2006.01)
  *B22F 10/10*   (2021.01)
  *B22F 10/20*   (2021.01)

(52) U.S. Cl.
  CPC ............ *C22C 1/023* (2013.01); *C22C 19/056* (2013.01); *C22F 1/10* (2013.01); *B22F 10/10* (2021.01); *B22F 10/20* (2021.01); *B22F 2201/11* (2013.01); *B22F 2301/15* (2013.01); *B22F 2304/10* (2013.01)

(56) References Cited

U.S. PATENT DOCUMENTS

| | | |
|---|---|---|
| 6,719,858 B2 | 4/2004 | Bond et al. |
| 7,028,746 B2 | 4/2006 | Akers et al. |
| 8,187,532 B2 | 5/2012 | Ohsone et al. |
| 8,470,106 B2 | 6/2013 | Cloue et al. |
| 8,961,646 B2 | 2/2015 | Gu et al. |
| 10,870,908 B2 | 12/2020 | Hattendorf |
| 10,923,248 B2 | 2/2021 | De Boer et al. |
| 2003/0164213 A1* | 9/2003 | Ueta ............... C22C 19/056 420/446 |
| 2007/0221298 A1* | 9/2007 | Kurata ............ C22C 19/056 420/443 |
| 2009/0038717 A1 | 2/2009 | Mannan et al. |
| 2012/0037280 A1* | 2/2012 | Devaux ............ C22F 1/10 148/501 |
| 2012/0141293 A1* | 6/2012 | Sato ............... C22C 19/056 420/448 |
| 2016/0289807 A1 | 10/2016 | Hattendorf |
| 2016/0319402 A1 | 11/2016 | Hattendorf |
| 2018/0100217 A1* | 4/2018 | Kang .............. C22C 19/057 |
| 2020/0087759 A1 | 3/2020 | Masaki et al. |

FOREIGN PATENT DOCUMENTS

| | | |
|---|---|---|
| DE | 102 96 848 T5 | 4/2004 |
| DE | 10 2012 024 130 A1 | 6/2014 |
| DE | 10 2014 008 136 A1 | 12/2014 |
| DE | 10 2015 008 136 A1 | 3/2016 |
| DE | 10 2015 016 729 A1 | 6/2017 |
| EP | 2 314 725 A1 | 4/2011 |
| EP | 2 835 434 A2 | 2/2015 |
| EP | 2 834 434 B1 | 8/2019 |
| GB | 1 344 917 A | 1/1974 |
| GB | 2 283 248 A | 5/1995 |
| JP | S61119641 A | 6/1986 |
| JP | S62158846 A | 7/1987 |
| JP | H04297537 A | 10/1992 |
| JP | 2002-234134 A | 8/2002 |
| JP | 2002-235134 A | 8/2002 |
| JP | 2003-113434 A | 4/2003 |
| JP | 4245351 B2 | 3/2009 |
| JP | 2013-059768 A | 4/2013 |
| JP | 2014-019916 A | 2/2014 |
| JP | 2014-019924 A | 2/2014 |
| JP | 2014-227584 A | 12/2014 |
| JP | 2017-508884 A | 3/2017 |
| RU | 1802466 A1 | 4/1995 |
| RU | 2038401 C1 | 6/1995 |
| RU | 2070601 C1 | 12/1996 |
| RU | 2124417 C1 | 1/1999 |
| RU | 2272083 C2 | 3/2006 |
| RU | 2 623 540 C1 | 6/2017 |
| RU | 2627137 C1 | 8/2017 |
| WO | 02/072897 A1 | 9/2002 |
| WO | 2008/081118 A2 | 7/2008 |
| WO | 2009/136636 A1 | 11/2009 |
| WO | 2018/003887 A1 | 1/2018 |

OTHER PUBLICATIONS

International Search Report in PCT/DE2020/100210, mailed Jun. 26, 2020.

Luca Foroni et al., "Hydrogen Embrittlement Susceptibility of Precipitation Hardened NI-Alloys," Corrosion 2014, Paper No. 3948, downloaded Jun. 23, 2021, 15 pages.

English translation of the International Preliminary Report on Patentability and Written Opinion of the International Searching Authority in PCT/DE2020/100210, dated Sep. 30, 2021.

* cited by examiner

LB250643

LB250646

LB250647

LB250650

LB250648

LB250649

LB250680

LB250682

LB250684

LB250674

LB250679

LB250678

LB250672

LB250673

LB250683

LB P01

LB P04

LB P05

NICKEL ALLOY HAVING GOOD RESISTANCE TO CORROSION AND HIGH TENSILE STRENGTH, AND METHOD FOR PRODUCING SEMI-FINISHED PRODUCTS

CROSS REFERENCE TO RELATED APPLICATIONS

This application is the National Stage of PCT/DE2020/100210 filed on Mar. 17, 2020, which claims priority under 35 U.S.C. § 119 of German Application Nos. 10 2019 106 776.6 filed on Mar. 18, 2019 and 10 2020 106 433.0 filed on Mar. 10, 2020, the disclosures of which are incorporated by reference. The international application under PCT article 21(2) was not published in English.

The invention relates to a nickel alloy having excellent resistance to hydrogen embrittlement and very good mechanical properties.

Age-hardenable nickel alloys have long been used in the oil & gas producing industry, when higher strengths are required. For this area of use, a good corrosion resistance, especially in atmospheres containing $H_2S$ and Cl, combined with good mechanical properties is needed. Yield stress, notch impact values and strength are additionally important criteria for the material selection. Examples according to the prior art are listed in Table 1.

The material alloy 718, which has the following general chemical composition (in wt %): 18.5% chromium, <0.1% carbon, 18% iron, 0.9% titanium, 0.6% aluminum, 3% molybdenum, 5% niobium+tantalum, the rest Ni and smelting-related impurities, is used among others for this application. Increasing requirements on this material are necessitating the new development of a nickel alloy having improved properties.

The alloy named alloy 718 is the material that has been selected for applications in which the highest mechanical strength values are required. The application temperature for this purpose is not higher than approximately 200° C. The material has good corrosion properties against hydrogen embrittlement and stress corrosion cracking and has a high mechanical strength. In view of the representativeness of the use of the material alloy 718, this alloy is considered as the basis for further or new development.

TABLE 1

| | | | | | | | |
|---|---|---|---|---|---|---|---|
| | | \multicolumn{6}{c}{Examples according to the prior art} | | | | | |
| UNS number | | UNS N07718 | UNSN06625 | UNS N07718 | UNS N09925 | UNS N05500 | UNS N07725 |
| Material name | | Alloy 718 | Alloy 625* | Alloy 625 | Alloy 925 plus | Alloy K-500* | Alloy 725 |
| Chemical composition | C | 0.045 max | 0.10 max | 0.030 max | 0.025 max | 0.25 max | 0.030 max |
| | Mn | 0.35 max | 0.50 max | 0.20 max | 1.00 max | 1.5 max | 0.35 max |
| | Cr | 17.0-21.0 | 20.0-23.0 | 19.0-22.0 | 19.5-23.5 | | 19.0.-22.5 |
| | Ni | 50.0-55.0 | Rest | 59.0-63.0 | 42.0-46.0 | 63.0-70.0 | 55.0-59.0 |
| | Mo | 2.80-3.30 | 8.0-10.0 | 7.0-9.5 | 2.50-3.50 | | 7.00-9.50 |
| | P | 0.010 max | 0.015 max | 0.015 max | 0.020 max | 0.02 max | 0.015 max |
| | Cu | 0.23 max | | | 1.50-3.00 | Rest | |
| | Al | 0.40-0.60 | 0.40 max | 0.35 max | 0.10-0.50 | 2.30-3.15 | 0.35 max |
| | Ti | 0.80-1.15 | 0.40 max | 1.0-1.6 | 1.90-2.40 | 0.35-0.85 | 1.00-1.70 |
| | Nb | 4.75-5.50 | 3.15-4.15 | 2.75-4.00 | 0.08-0.50 | | 2.75-4.00 |
| | B | 0.0060 max | | 0.006 max | | | |
| | Fe | Rest | 5.0 max | 5 | 22 min | 2.0 max | Rest |

(API Standard 6ACRA *NACE MR 0175)

The alloy named alloy 718 is a deformable and age-hardenable nickel-chromium alloy, developed by H. Eiselstein and patented in 1962 under U.S. Pat. No. 3,046,108. Alloy 718 has a good combination of high strength properties and good ductility over a broad temperature range. The material was developed for the aviation industry and some years later was introduced into the oil & gas sector due to the combination of good corrosion resistance and good mechanical properties.

U.S. Pat. No. 3,160,500 discloses a matrix-reinforced nickel-chromium alloy, which subsequently led to development of the alloy named alloy 625, which has a combination of good mechanical properties over a broad temperature range and a high resistance to fracture and stress at elevated temperature. This material has found broad application due to its attractive combination of strength and corrosion resistance. The high chromium and molybdenum contents ensure a good corrosion resistance and strength, while iron and niobium ensure a further strength. The aluminum and titanium additions serve mainly metallurgical purpose and are kept low for improvement of weldability. The alloy has the following composition: 21.44-21.68% Cr, 0.02-0.03% C, 0.11-0.12% Mn, 0.04-0.11% Si, 8.83-9.1% Mo, up to 5.32% W, 4.19-4.35% Nb, 0.16-0.23% Al, 0.13-0.20% Ti, 1.92-6.89% Fe, up to 0.02% Mg, the rest Ni.

DE 102015016729 A1 discloses a method for the manufacture of a nickel-base alloy, in which
an electrode is generated by VIM,
for reduction of stresses and for overaging, the electrode is subjected in a furnace to a heat treatment in the temperature range between 400 and 1250° C. for a duration of 10 to 336 hours,
in a manner depending on dimensions, especially depending on diameter, the electrode is cooled in air or in the furnace to a temperature between room temperature and lower than 1250° C., especially lower than 900° C.,
the cooled electrode is then remelted by VAR at a remelting rate of 3.0 to 10 kg/minute to obtain a VAR ingot,
the VAR ingot is heat-treated in a furnace in the temperature range between 400 and 1250° C. for a duration of 10 to 336 hours.
in a manner depending on dimensions, especially depending on diameter, the VAR ingot is cooled in air or in the furnace to a temperature between room temperature and lower than 1250° C., especially lower than 900° C.,
the VAR ingot is remelted once again at a remelting rate of 3.0 to 10 kg/minute.
the remelted VAR ingot is subjected to a heat treatment in the temperature range between 400 and 1250° C. for a duration of 10 to 336 hours,
the VAR ingot is then brought by hot-working and/or cold-working to the desired product shape and dimension.

The Ni-base alloy may have the following composition: C max. 0.25%, S max. 0.15%, Cr 17-32%, Ni 45-72%, Mn max. 1%, Si max. 1%, Ti max. 3.25%, Nb max. 5.5%, Cu max. 5%, Fe max. 25%, P max. 0.03%, Al max. 3.15%, V max. 0.6%, Zr max. 0.12%, Co max. 28%, B max. 0.02%, and production-related impurities.

Alloy 625 Plus was developed on the basis of alloy 625 and alloy 718. Alloy 625 Plus is an alloy having high strength as an alternative to alloy 625, with similar corrosion resistance, achieved by the increase of the titanium content.

The applications for the age-hardenable alloy named alloy 925 are very similar to those for alloy 718. They include bars and pipes for oil sources, structural parts for gas sources, valves, heavy bars, connecting components and packers.

Alloy 925 is used when the strength requirements are somewhat less stringent than for alloy 718.

Nicorros Alloy K-500 (N05500) is a nickel-copper alloy that can be age-hardened via the formation of gamma' phase. It finds use in the offshore industry, which is not heavily burdened with hydrogen sulfide. The corrosion resistance in acid gas media as well as the mechanical strengths are lower than for the alloys such as alloy 718 and alloy 925.

Alloy 725 offers the high strength at a level similar to that of alloy 718 and has a corrosion resistance similar to that of alloy 625.

The proportion and the presence of age-hardening phases have a significant and direct influence on the hydrogen embrittlement resistance. According to the literature, materials that do not have any precipitation phases and thus are not age-hardenable exhibit significantly better hydrogen embrittlement resistance in comparison with hardenable materials that contain precipitation phases.

The task of the invention is to develop, based on alloy 718, an alloy that, with improved resistance to acid gas and hydrogen embrittlement, is further also able to achieve a higher yield stress as well as a high strength, wherein a lower proportion of delta and gamma" phase and higher proportion of gamma' phase are preferred.

The task of the invention is also to provide a method for the manufacture of an alloy based on alloy 718, by means of which a higher yield stress as well as a high strength can be achieved, wherein a low proportion of delta and gamma" phase and higher proportions of gamma' phase are assured.

The first task is accomplished by a nickel alloy having (in wt %)

| Ni | 50-55% |
|---|---|
| Cr | 17-21% |
| Mo | >0-9% |
| W | 0-9% |
| Nb | 1-5.7% |
| Ta | >0-4.7% |
| Ti | >0-3.0% |
| Al | 0.4-4.0% |
| Co | max. 3.0% |
| Mn | max. 0.35% |
| Si | max. 0.35% |
| Cu | max. 0.23% |
| C | 0.001-0.045% |
| S | max. 0.01% |
| P | 0.001-0.02% |
| B | 0.001-0.01% |

Fe the rest and the usual process-related impurities, wherein the following relationships are fulfilled

| Nb + Ta | 1-5.7% | (1) |
|---|---|---|
| Al + Ti | >1.2-5% | (2) |
| Mo + W | 3-9% | (3) | wherein Nb, Ta, Al and Ti are the concentrations of the elements in question in wt %.

Advantageous further developments of the nickel alloy according to the invention can be inferred from the associated specific dependent claims.

The further task is accomplished on the one hand by a method for the manufacture of a powder from a nickel-base alloy, in which
an alloy is smelted in a VIM furnace,
the molten melt is maintained for 5 minutes to 2 hours for homogenization, a closed atomization system having a supplied gas is adjusted to a dew point of 10° C. to 120° C., the melt is blown by a nozzle in a gas stream with a gas flow rate of 2 m³/min to 150 m³/min, the solidified powder particles are collected in a gas-tightly closed container, wherein the particles have a particle size of 5 μm to 250 μm, the particles of the powder are spherical, the powder has gas inclusions of 0.0 to 4% pore area (pores>1 μm) in relationship to the total area of evaluated objects, the powder has a bulk density of 2 up to the density of the alloy, which is approximately 8 g/cm³, the powder is packed air-tightly under the protective-gas atmosphere with argon.

On the other hand, the further task is also accomplished by a method for the manufacture of a nickel alloy containing (in wt %):

| Ni | 50-55% |
|---|---|
| Cr | 17-21% |
| Mo | >0 to 9% |
| W | 0-9% |
| Nb | 1-5.7% |
| Ta | >0-4.7% |
| Ti | >0-3.0% |
| Al | 0.4-4.0% |
| Co | max. 3.0% |
| Mn | max. 0.35% |
| Si | max. 0.35% |
| Cu | max. 0.23% |
| C | 0.001-0.045% |
| S | max. 0.01% |
| P | 0.001-0.02% |
| B | 0.001-0.01% |

Fe the rest and the usual process-related impurities, wherein the following relationships are fulfilled

| Nb + Ta | 1-5.7% | (1) |
|---|---|---|
| Al + Ti | >1.2-5% | (2) |
| Mo + W | 3-9% | (3) | wherein Nb, Ta, Al and Ti are the concentrations of the elements in question in wt %. in which the alloy is smelted in a vacuum induction melting (VIM) furnace and cast into ingots, these VIM ingots are subjected to a stress relief annealing in the temperature range of 500-1250° C. for a duration of up to 110 h, followed by a treatment of the ingots in an electroslag remelting process (ESR) and/or in a vacuum arc remelting process (VAR), the remelted ingots are homogenization-annealed in the temperature range of 500° C. to 1250° C. for a duration of up to 150 h, then the annealed ingots are hot-worked and/or cold-worked to semifinished products, wherein at least one intermediate annealing is carried out if necessary in the temperature range of 900° C. to 1150° C. for a duration of 0.1 to 60 h, followed by a cooling in air, in a moving annealing atmosphere, inert gas, in water, in polymer or in oil.

Alternatively, the task is also accomplished by a method for the manufacture of a nickel alloy containing (in wt %)

| Ni | 50-55% |
|---|---|
| Cr | 17-21% |
| Mo | >0 to 9% |
| W | 0-9% |
| Nb | 1-5.7% |
| Ta | >0-4.7% |
| Ti | 0.1-3.0% |
| Al | 0.4-4.0% |
| Co | max. 3.0% |
| Mn | max. 0.35% |
| Si | max. 0.35% |
| Cu | max. 0.23% |
| C | 0.001-0.045% |
| S | max. 0.01% |
| P | 0.001-0.02% |
| B | 0.001-0.01% |

Fe the rest and the usual process-related impurities, wherein the following relationships are fulfilled

| Nb + Ta | 1-5.7% | (1) |
|---|---|---|
| Al + Ti | >1.2-5% | (2) |
| Mo + W | 3-9% | (3) | wherein Nb, Ta, Al and Ti are the concentrations of the elements in question in wt %, in which the alloy is smelted in the open, followed by a treatment in a VOD or AOD system and cast into ingots, these ingots are subjected if necessary to a stress relief annealing in the temperature range of 500-1250° C. for a duration of up to 110 h, followed by at least one, especially two VAR remelting processes, the remelted ingots are homogenization-annealed in the temperature range of 500° C. to 1250° C. for a duration of up to 150 h, then the annealed ingots are hot-worked and cold-worked to semifinished products, followed by at least one solution annealing in the temperature range of 900° C. to 1150° C. for a duration of 0.1 to 60 h, followed by a cooling in air, in a moving annealing atmosphere, inert gas, in water, in polymer or in oil.

Advantageous further developments of this method according to the invention can be inferred from the associated dependent claims according to the method.

Due to the alternative smelting processes, the following combinations are now possible:
VIM/(ESR or VAR)/(ESR or VAR) if necessary
EF/(VOD or AOD)/VAR/VAR The alloy according to the invention is preferably usable in the product forms of
bars,
wire,
strip,
sheet,
longitudinally welded pipe,
seamless pipe,
powder.

The semifinished products/structural parts are preferably used in the oil and gas industry as well as the chemical process industry.

The existence of any precipitated phase was analyzed and investigations were carried out to better understand the interaction of the hydrogen atom with the crystal structure when various positions in the unit cell are occupied with a hydrogen atom. The preferred sites for the capture of hydro gen at the phase boundaries or in the matrix material were calculated, taking into consideration the enthalpy energy of the hydrogen when that site is occupied. Based on these results, numerous tension tests were carried out to investigate the bonding relationships between the metal atoms in the vicinity of the phase boundaries.

(0.5 M sulfuric acid solution at 40° C. with an applied current density of 5 mA/cm$^2$, in order to achieve cathodic polarization), and the ratio of elongation at break was determined between aggressive and inert surroundings. A higher ratio of the elongation at break could explain why the resistance to hydrogen embrittlement is also higher.

TABLE 2

Ratio of the proportions by weight of the gamma'/gamma" phases measured by means of the neutron diffraction method and ratio of elongation at break in the SSRT test under cathodic polarization in a sulfuric acid solution

| Age-hardening | | Lattice parameters and proportion by weight of the participating phases (wt %) | | | | Particle size (spherical particles with lognormal distributed particle size) | | Ratio of |
|---|---|---|---|---|---|---|---|---|
| Temperature [° C.] | Duration (h) | Gamma matrix | Gamma' phase | Gamma" phase | γ'/γ" proportion | Particle size (nm) | Particle density (%) | elongation at break |
| 720 + 720 | 8 + 8 | a = b = c = 3.59820 (67) | a = b = c = 3.5875 (19) | a = b = 3.6167 c = 7.248 (14) | 1.36 | 4<br>11<br>87.7 | 0.23<br>0.15<br>0.11 | 92% |
| 760 | 8 | a = b = c = 3.59774 (73.6) | a = b = c = 3.5914 (12.7) | a = b = 3.6060 c = 7.412 (13.7) | 0.93 | 3.88<br>88.6 | 1.32<br>0.11 | 66% |
| 790 | 8 | a = b = c = 3.59809 (76.6) | a = b = c = 3.5934 (13.1) | a = b = 3.6040 c = 7.4295 (10.3) | 1.27 | 5.4<br>19<br>93 | 0.24<br>0.05<br>0.12 | 75% |

According to the present invention, the presence of a hydrogen atom in the most stable position at the gamma/gamma' phase boundary has no influence on the tensile strength in comparison with a system without hydrogen atoms (FIG. 1). In contrast to this, when the hydrogen atom occupies the most stable position of the gamma/gamma" phase boundary, a larger atom transposition occurs and the system has a lower tensile strength in comparison with a system without hydrogen atom (FIG. 2). This suggests that hydrogen embrittlement may occur. Delta phase—it is not present in representative proportions in the alloy named alloy 718 for oil & gas applications—has no representative influence with respect to the mechanical effect (FIG. 3).

Alloy 718 can be obtained in three different variants with different requirements concerning the yield stress. The 120K variant has a minimum yield stress of 120 ksi, which is achieved by age-hardening at temperatures between 774 and 802° C. The 140K variant has a minimum yield stress of 140 ksi, which is achieved by age-hardening at temperatures between 760 and 802° C. The 150K is the variant that is produced by a two-stage age-hardening at a first temperature of 700 to 750° C. and then at a second temperature of 600 to 659° C., and it has a minimally required yield stress of 150 ksi.

The various heat treatment methods are capable of producing different microstructure (FIG. 4), which was investigated by comparison with the behavior against hydrogen embrittlement. Gamma' phase is precipitated in the form of punctiform particles, whereas gamma" phase exhibits an acicular shape.

A smaller ratio of the proportions by weight of the gamma'/gamma" phases leads to the poorest behavior against hydrogen embrittlement, whereas a larger ratio of the proportions by weight of the gamma'/gamma" phases leads to a better resistance against hydrogen embrittlement. Table 2 summarizes these facts.

The hydrogen embrittlement resistance was tested by slow load tests under cathodic polarization according to NACE Publication 3948 from the year 2014. Samples were tested under inert surroundings (deionized water, purged with nitrogen at 40° C.) and under aggressive surroundings The particle size of the gamma' and gamma" precipitates may also play a role in the mechanical and corrosion properties of nickel alloys.

Typical conditions for the occurrence of hydrogen embrittlement are material contacts with atomic or molecular hydrogen in combination with material stresses.

For the current nickel alloy named alloy 718, which is being increasingly used in the oil & gas industry, the addition of the alloying elements has the following reasons:

Iron is effective for reducing metal costs, but cannot be used excessively for alloying due to the impairment of the material properties.

Chromium is used in order to increase the room-temperature strength and simultaneously to guarantee the general corrosion resistance. In combination with the carbon, chromium forms carbides, which increase the high-temperature strength.

In general, it is to be remarked that the pitting corrosion resistance in chloride-containing media increases with increasing content of molybdenum. The resistance to stress corrosion cracking at higher temperatures is also improved with an increase of the molybdenum content. If necessary, molybdenum may be replaced by tungsten.

The austenitic matrix from the gamma phase is age-hardened by the intermetallic gamma' precipitates, an ordered fcc phase of $Ni_3(Al/Ti)$, and gamma" tetragonal $Ni_3Nb$ phase, and so aluminum, titanium and niobium are used for alloying. If necessary, niobium may be substituted by tantalum. Niobium is used preferably by reason of metal costs. The increase of the proportions of Al and Ti should lead to more gamma', and the decrease of the proportion of Nb should restrict the formation of gamma".

Delta phase is the equilibrium phase of the precipitation-hardening gamma" phase ($Ni_3Nb$) and, according to a possibly applicable specification, is permitted to be present only in very low contents in the microstructure, since it acts negatively on the mechanical and corrosion properties. The formation of the delta phase is prevented by use of solution-annealing temperatures above the delta soleus temperature.

In reducing atmospheres, hydrogen is able to penetrate into the material, and so hydrogen embrittlement may occur.

The presence of the hydrogen atoms in the crystalline structure of the material leads to weakening of the atomic bonds. This causes a loss of tensile strength and may lead to material failure under mechanical load.

Given adequately high titanium, aluminum, molybdenum and niobium contents, combined with a defined heat treatment, the nickel alloy according to the invention has an excellent hydrogen embrittlement resistance, but at the same time
- a good strength
- a good crack corrosion and pitting corrosion resistance
- a good phase stability
- a good processability The nickel content lies between 50 and 55%, wherein preferred ranges may be adjusted as follows:
- 51 to 55%
- 52 to 55%
- 53 to 55%

Lower proportions of nickel may be substituted by cobalt, but nickel is used preferably on the basis of metal costs.

Cobalt is present in the alloy with a content of at most 3%. Preferred contents may be specified as follows:
- 0.01 to 1%
- 0.01 to max. 0.8%
- 0.01 to max. 0.6%
- 0.01 to max. 0.4%

The range of values for the element chromium lies between 17 and 21%, wherein preferred ranges may be adjusted as follows:
- 17 to 20%
- 17 to 19%
- 18 to 19%

The molybdenum content lies between >0 and 9%, wherein here also, depending on the area of service of the alloy, preferred molybdenum contents may be adjusted as follows:
- 0.01-8.5%
- 0.1-8.0%
- 3 to 8%
- 3 to 7%
- >3.3-9%
- 3.73-9%

If necessary, the element molybdenum may be replaced at least partly by tungsten, provided tungsten is not specified as an independent element within the stated limits. Combinations of Mo+W—depending on the application situation—are likewise possible. If applicable, tungsten may be adjusted in contents of 0 to 9%. Preferably, W may be adjusted within the following range of values in the alloy:
- >0-9%
- 0.001-9%
- 0.01-9%
- 0.1-9%
- 1 to 9%
- 1 to 8%
- 3 to 7%
- 3 to 8%
- >3.3-9%

The content of niobium lies between 1 and 5.7%, wherein, depending on the area of application, preferred contents of the elements may be adjusted within the following ranges of values:
- 2 to 4.5%
- 2 to 4%
- 2 to 3.5%

The titanium content lies between >0 and 3.0%. Preferably, Ti may be adjusted within the following range of values in the alloy:
- 0.5 to 3.0%
- 1.0 to 3.0%
- 1.0 to 2.0%
- >1.15-3%
- 1.18-3%

The same is true for the element aluminum, which may have a content of 0.4 to 4.0% in the alloy. Alternatively, the following ranges of values are also conceivable:
- 0.6 to 4.0%
- 0.6-1.5%
- 0.8-4%
- 0.9-4.0%
- 1.0 to 4.0%
- 1.0 to 3.3%
- 1.5 to 3.0%

The element manganese is specified as follows in the alloy:
- max. 0.35%

The element silicon is specified as follows in the alloy:
- max. 0.35%

Copper is present in the alloy with the following content:
- max. 0.23%

The carbon content lies at most at 0.045%. Preferably, C may be adjusted within the following range of values in the alloy:
- 0.001 to max. 0.035%
- 0.001 to max. 0.025%
- 0.001 to max. 0.015%

A maximum content of 0.01% sulfur is permitted in the alloy.

Furthermore, the alloy contains phosphorus in contents between 0.001 and 0.02%. Preferred further contents may be specified as follows:
- 0.001 to 0.015%

The boron content lies between 0.001 and 0.01%, wherein, alternatively, the following ranges of values are also conceivable:
- 0.003 to 0.01%
- 0.005 to 0.01% the rest iron and process-related impurities.

The following relationship between niobium and tantalum must be fulfilled in order that an adequate but also limited content of gamma" precipitates is assured:

Nb+Ta=1 to 5.7%, wherein Nb and Ta are the concentrations of the elements in question in wt %.

Preferred ranges may be adjusted with:

Nb+Ta=<4.75%

Nb+Ta=1-4.75%

Nb+Ta=1 to 5.0%

Nb+Ta=2 to 4%

Nb+Ta=2 to 3.5%

Nb+Ta=1.6-4%

Nb+Ta=1-4%

Beyond this, the following relationship must be fulfilled in order that an adequate gamma' phase stability is assured:

Al+Ti=>1.2 to 5%, wherein Al and Ti are the concentrations of the elements in question in mass %.

Preferred ranges may be adjusted:

Al+Ti=1.5 to 5%

Al+Ti=1.8 to 5%

Al+Ti=1.8 to 3.5%

Al+Ti=>1.95%

Al+Ti=>1.95-5%

The relationship Mo+W=3-9% is possible. If necessary, the following restriction may also be accepted here:

Mo+W=>3.3%

Mo+W=>3.3-9%

If the formation of eta phase is intended, the following relationship should be fulfilled:

Ti/Al>2 or

Al/Ti>2, wherein Al and Ti are the concentrations of the elements in question in wt %.

The alloy according to the invention is preferably smelted and cast in the vacuum induction melting furnace (VIM), followed by a treatment in an electroslag remelting process (ESR) or in a vacuum arc remelting process (VAR). If necessary, the alloy is remelted once again in a treatment in an electroslag remelting process (ESR) or in a vacuum arc remelting process (VAR).

Possibly the alloy according to the invention will be smelted in the open followed by a treatment in a vacuum oxygen decarburization (VOD) or argon oxygen decarburization (AOD), followed by two vacuum arc remelting processes (VAR).

The fabricated ingots of the alloy are heat treated if necessary at temperatures between 500° C. and 1250° C. for an annealing duration of up to 150 h, then hot-worked and cold-worked to the desired semifinished products such as billets, bars, wires, sheets, strips and foils, if necessary with intermediate annealings between 800° C. and 1270° C. for 0.05 h to 100 h. If necessary, the surface of the material may be abraded chemically and/or mechanically (e.g. by scalping, turning, grinding) for cleaning (even several times) from time to time or at the end. Thereafter a solution annealing is carried out if necessary in the temperature range of 970° C. to 1150° C. for 0.1 h to 60 h, if necessary under protective gas, such as argon or hydrogen, for example, followed by a cooling in air, if necessary in the moving annealing atmosphere, in inert gas, in water, in polymer or in oil.

Thereafter an age-hardening annealing is performed if necessary in the temperature range of 600° C. to 900° C. for 0.1 h to 60 h, if necessary in a 2nd stage with a further age-hardening annealing of 550° C. to 900° C. for 0.1 h to 60 h.

The age-hardening annealing lies in the temperature range of 600° C. to 900° C. for 0.1 h to 60 h, wherein preferred ranges may be adjusted as follows:

600° C. to 800° C. for 0.1 h to 60 h
600° C. to 750° C. for 0.1 h to 60 h
700° C. to 900° C. for 0.1 h to 60 h
750° C. to 900° C. for 0.1 h to 60 h If necessary, the age-hardening annealing takes place in a 2-stage age-hardening, with a further age-hardening annealing of 550° C. to 900° C. for 0.1 h to 60 h, wherein preferred ranges may be adjusted as follows:

1st-stage age-hardening in the temperature range of 600° C. to 800° C. for 0.1 h to 60 h and 2nd-stage age-hardening in the temperature range of 550° C. to 750° C. for 0.1 h to 60 h 1st-stage age-hardening in the temperature range of 600° C. to 800° C. for 0.1 h to 60 h and 2nd-stage age-hardening in the temperature range of 800° C. to 900° C. for 0.1 h to 60 h 1st-stage age-hardening in the temperature range of 750° C. to 900° C. for 0.1 h to 60 h and 2nd-stage age-hardening in the temperature range of 550° C. to 750° C. for 0.1 h to 60 h 1st-stage age-hardening in the temperature range of 750° C. to 900° C. for 0.1 h to 60 h and 2nd-stage age-hardening in the temperature range of 750° C. to 900° C. for 0.1 h to 60 h If necessary, chemical and/or mechanical cleanings of the material surface may be performed (e.g. by scalping, turning, grinding) from time to time and/or after the last annealing.

The alloy according to the invention can be worked well to, and used in, the product forms of bar, wire, strip, sheet, longitudinally welded pipe and seamless pipe.

If necessary, the alloy may be manufactured and used in the product form of powder (e.g. for additive fabrication methods). In the process, the powder is manufactured in a VIGA (vacuum induction gas atomizer) powder atomization system or with a different method and selected or filtered with respect to the desired range of powder particle sizes.

The alloy according to the invention should be used preferably in areas in which hydrogen-containing media are scheduled, such as completion tools, packers, pump shafts, hangers, valves, retaining brackets, bottles, housing material for magnetic measuring sensors (measure while drilling, MWD), etc.

Given the combination of chemical composition with the heat treatment, the alloy according to the invention should preferably have a proportion of gamma'/gamma" higher than 1.3, preferably higher than 1.5. With this combination, it is also possible to achieve the yield stress higher than 120 ksi.

Performed Calculations/Tests:

The phases occurring in equilibrium were calculated for various alloy variants with the JMatPro program of Thermotech. The database for nickel-base alloys of Thermotech was used as the database for the calculations. Using the "Heat Treatment" mode of the JMatPro software, the proportions of the phases, particle sizes as well as the expected mechanical properties (e.g. yield stress, tensile strength, hardness) were calculated, when the material of the appropriate chemical composition is annealed at different age-hardening temperatures.

Description of the Properties:

The alloy according to the invention is intended to have, besides an excellent hydrogen embrittlement resistance, at the same time the following properties:

a good strength
a good crack corrosion and pitting corrosion resistance
a good phase stability
a good processability In the nickel-chromium-aluminum-iron-titanium-niobium system, various phases such as gamma', gamma", delta and eta phases may be formed with different alloying contents. The results of the calculations of the equilibrium proportions of the first calculated chemical compositions are listed in Tables 3.1 and 3.2. The calculations were all performed for an age-hardening temperature of 790° C.

The chemical compositions LV1, 8, 9 and 39 are examples of alloys that are not according to the invention.

TABLE 3.1

Chemical composition, mechanical properties and proportions of the precipitation phases after age-hardening at 790° C. (Part 1)

| Element | LV 1 | LV 2 | LV 3 | LV 4 | LV 41 | LV 5 | LV 6 |
|---|---|---|---|---|---|---|---|
| C | 0.013 | 0.013 | 0.013 | 0.013 | 0.013 | 0.013 | 0.013 |
| N | 0.01 | 0.01 | 0.01 | 0.01 | 0.01 | 0.01 | 0.01 |
| Cr | 18.53 | 18.53 | 18.53 | 18.53 | 18.53 | 18.53 | 18.53 |
| Ni | 54.15 | 54.15 | 54.15 | 54.15 | 54.15 | 54.15 | 54.15 |
| Mo | 3.05 | 3.05 | 3.05 | 3.05 | 3.05 | 3.05 | 3.05 |
| W | 0.01 | 0.01 | 0.01 | 0.01 | 0.01 | 0.01 | 0.01 |
| Ti | 0.95 | 0.95 | 0.95 | 0.95 | 0.95 | 0.95 | 0.95 |
| Nb | 0 | 1.5 | 2.5 | 3.5 | 4 | 4.9 | 5.05 |
| Fe* | Rest | Rest | Rest | Rest | Rest | Rest | Rest |
| P | 0.007 | 0.007 | 0.007 | 0.007 | 0.007 | 0.007 | 0.007 |
| Al | 0.54 | 0.54 | 0.54 | 0.54 | 0.54 | 0.54 | 0.54 |
| B | 0.004 | 0.004 | 0.004 | 0.004 | 0.004 | 0.004 | 0.004 |
| Ta | 0.01 | 0.01 | 0.01 | 0.01 | 0.01 | 0.01 | 0.01 |
| Co | 0.01 | 0.01 | 0.01 | 0.01 | 0.01 | 0.01 | 0.01 |
| Cu | 0.02 | 0.02 | 0.02 | 0.02 | 0.02 | 0.02 | 0.02 |
| Mn | 0.03 | 0.03 | 0.03 | 0.03 | 0.03 | 0.03 | 0.03 |
| Si | 0.05 | 0.05 | 0.05 | 0.05 | 0.05 | 0.05 | 0.05 |
| Age-hardening temp. [° C.] | 790 | 790 | 790 | 790 | 790 | 790 | 790 |
| Rp 0.2 [ksi] | 59.27 | 82.91 | 107.4 | 128.66 | 139.49 | 151.59 | 148.52 |
| Rm [ksi] | 125.52 | 147.89 | 166.92 | 181.98 | 189.41 | 197.7 | 195.6 |
| Hardness [HRC] | 13.93 | 23.62 | 30.33 | 34.77 | 36.71 | 38.71 | 38.22 |
| γ ' [%] | 0.645 | 4.92 | 6.46 | 6.8 | 7.71 | 7.25 | 5.69 |
| γ ' size (nm) | 16.08 | 23.07 | 23.91 | 23.89 | 23.96 | 23.78 | 23.43 |
| γ " [%] | 0 | 0 | 0.998 | 3.79 | 5.05 | 7.69 | 8.34 |
| γ " size (nm) | — | — | 64.47 | 68.74 | 67.74 | 66.13 | 67.62 |
| γ '/γ " proportion | >100 | >100 | 6.47 | 1.79 | 1.53 | 0.94 | 0.68 |

| Element | LV 8 | LV 9 | LV 10 | LV 11 | LV 12 | LV 13 | LV 14 |
|---|---|---|---|---|---|---|---|
| C | 0.013 | 0.013 | 0.013 | 0.013 | 0.013 | 0.013 | 0.013 |
| N | 0.01 | 0.01 | 0.01 | 0.01 | 0.01 | 0.01 | 0.01 |
| Cr | 18.53 | 18.53 | 18.53 | 18.53 | 18.53 | 18.53 | 18.53 |
| Ni | 54.15 | 54.15 | 54.15 | 54.15 | 54.15 | 54.15 | 54.15 |
| Mo | 3.05 | 3.05 | 3.05 | 3.05 | 3.05 | 3.05 | 3.05 |
| W | 0.01 | 0.01 | 0.01 | 0.01 | 0.01 | 0.01 | 0.01 |
| Ti | 0.95 | 0.95 | 0.95 | 0.95 | 0 | 0.5 | 0.85 |
| Nb | 5.03 | 5.03 | 5.03 | 5.03 | 5.03 | 5.03 | 5.03 |
| Fe* | Rest | Rest | Rest | Rest | Rest | Rest | Rest |
| P | 0.007 | 0.007 | 0.007 | 0.007 | 0.007 | 0.007 | 0.007 |
| Al | 0 | 0.25 | 0.45 | 0.55 | 0.54 | 0.54 | 0.54 |
| B | 0.004 | 0.004 | 0.004 | 0.004 | 0.004 | 0.004 | 0.004 |
| Ta | 0.01 | 0.01 | 0.01 | 0.01 | 0.01 | 0.01 | 0.01 |
| Co | 0.01 | 0.01 | 0.01 | 0.01 | 0.01 | 0.01 | 0.01 |
| Cu | 0.02 | 0.02 | 0.02 | 0.02 | 0.02 | 0.02 | 0.02 |
| Mn | 0.03 | 0.03 | 0.03 | 0.03 | 0.03 | 0.03 | 0.03 |
| Si | 0.05 | 0.05 | 0.05 | 0.05 | 0.05 | 0.05 | 0.05 |
| Age-hardening temp. [° C.] | 790 | 790 | 790 | 790 | 790 | 790 | 790 |
| Rp 0.2 [ksi] | 143.33 | 154.72 | 155.5 | 151.33 | 113,71 | 135.41 | 147.9 |
| Rm [ksi] | 192.06 | 199.84 | 200.37 | 197.52 | 171.48 | 186.63 | 195.18 |
| Hardness [HRC] | 37.37 | 39.19 | 39.31 | 38.67 | 31.75 | 36 | 38.12 |
| γ ' [%] | 0.906 | 4.16 | 6.74 | 7.85 | 0 | 2.13 | 6.4 |
| γ ' size (nm) | 19.46 | 22.14 | 23.42 | 23.88 | — | 21.31 | 23.63 |
| γ " [%] | 10.353 | 9.323 | 8.25 | 7.28 | 9.213 | 9.581 | 7.61 |
| γ " size (nm) | 62.95 | 64.8 | 65.06 | 66.06 | 67.55 | 72.21 | 67 |
| γ '/γ " proportion | 0.09 | 0.45 | 0.82 | 1.08 | 0 | 0.22 | 0.84 |

TABLE 3.2

Chemical composition, mechanical properties and proportions of the precipitation phases after age-hardening at 790° C. (Part 2)

| Element | LV 15 | LV 16* | LV 17 | LV 18 | LV 19 | LV 31 | LV 32 |
|---|---|---|---|---|---|---|---|
| C | 0.013 | 0.013 | 0.013 | 0.013 | 0.013 | 0.013 | 0.013 |
| N | 0.01 | 0.01 | 0.01 | 0.01 | 0.01 | 0.01 | 0.01 |
| Cr | 18.53 | 18.53 | 18.53 | 18.5 | 18.5 | 18.5 | 18.5 |
| Ni | 54.15 | 54.15 | 54.15 | 54.15 | 54.15 | 54.15 | 54.15 |
| Mo | 3.05 | 3.05 | 3.05 | 6 | 9 | 6 | 6 |
| W | 0.01 | 0.01 | 0.01 | 0.01 | 0.01 | 0.01 | 0.01 |
| Ti | 1.05 | 1.15 | 1.15 | 1.15 | 1.15 | 1.5 | 0.6 |

TABLE 3.2-continued

Chemical composition, mechanical properties and proportions of the precipitation phases after age-hardening at 790° C. (Part 2)

| | | | | | | | |
|---|---|---|---|---|---|---|---|
| Nb | 5.03 | 3.5 | 4 | 3.5 | 3.5 | 3.5 | 3.5 |
| Fe* | Rest | Rest | Rest | Rest | Rest | Rest | Rest |
| P | 0.007 | 0.007 | 0.007 | 0.007 | 0.007 | 0.007 | 0.007 |
| Al | 0.54 | 0.6 | 0.6 | 0.6 | 0.6 | 0.6 | 1.5 |
| B | 0.004 | 0.004 | 0.004 | 0.004 | 0.004 | 0.004 | 0.004 |
| Ta | 0.01 | 0.01 | 0.01 | 0.01 | 0.01 | 0.01 | 0.01 |
| Co | 0.01 | 0.01 | 0.01 | 0.01 | 0.01 | 0.01 | 0.01 |
| Cu | 0.02 | 0.02 | 0.02 | 0.02 | 0.02 | 0.02 | 0.02 |
| Mn | 0.03 | 0.03 | 0.03 | 0.03 | 0.03 | 0.03 | 0.03 |
| Si | 0.05 | 0.05 | 0.05 | 0.05 | 0.05 | 0.05 | 0.05 |
| Age-hardening temp. [° C.] | 790 | 790 | 790 | 790 | 790 | 790 | 790 |
| Rp 0.2 [ksi] | 155.9 | 131.6 | 140.4 | 135.2 | 139.0 | 139.9 | 90.7 |
| Rm [ksi] | 200.7 | 184.0 | 190.1 | 186.5 | 189.1 | 189.7 | 161.2 |
| Hardness [HRC] | 39 | 35 | 37 | 36 | 37 | 37 | 29 |
| $\gamma'$ [%] | 8.79 | 9.3 | 9.46 | 9.6 | 10 | 13 | 14 |
| $\gamma'$ size (nm) | 23.94 | 24.44 | 24.4 | 24.8 | 25.1 | 25.9 | 28.1 |
| $\gamma''$ [%] | 7.31 | 3.18 | 4.59 | 2.9 | 2.6 | 2.2 | 0.24 |
| $\gamma''$ size (nm) | 65.08 | 68.23 | 67.81 | 68.4 | 67.9 | 69.6 | 74.95 |
| $\gamma'/\gamma''$ proportion | 1.2 | 2.92 | 2.06 | 3.31 | 3.85 | 5.91 | 58.33 |

| Element | LV 33 | LV 33-1 | LV 34 | LV 35 | LV 36 | LV 38 | LV 39 |
|---|---|---|---|---|---|---|---|
| C | 0.013 | 0.013 | 0.013 | 0.013 | 0.013 | 0.013 | 0.013 |
| N | 0.01 | 0.01 | 0.01 | 0.01 | 0.01 | 0.01 | 0.01 |
| Cr | 18.5 | 18.5 | 18.5 | 18.5 | 18.5 | 18.5 | 18.53 |
| Ni | 54.15 | 54.15 | 54.15 | 54.15 | 54.15 | 54.15 | 54.15 |
| Mo | 6 | 6 | 6 | 6 | 6 | 6 | 0.01 |
| W | 0.01 | 0.01 | 0.01 | 0.01 | 0.01 | 0.01 | 4 |
| Ti | 1.9 | 1.9 | 1.2 | 1.6 | 1.2 | 1.2 | 0.95 |
| Nb | 2 | 2 | 2 | 1 | 1 | 0 | 5.03 |
| Fe* | Rest | Rest | Rest | Rest | Rest | Rest | Rest |
| P | 0.007 | 0.007 | 0.007 | 0.007 | 0.007 | 0.007 | 0.007 |
| Al | 0.6 | 0.9 | 1.2 | 1.2 | 1.6 | 1.9 | 0.55 |
| B | 0.004 | 0.004 | 0.004 | 0.004 | 0.004 | 0.004 | 0.004 |
| Ta | 0.01 | 0.01 | 0.01 | 0.01 | 0.01 | 0.01 | 0.01 |
| Co | 0.01 | 0.01 | 0.01 | 0.01 | 0.01 | 0.01 | 0.01 |
| Cu | 0.02 | 0.02 | 0.02 | 0.02 | 0.02 | 0.02 | 0.02 |
| Mn | 0.03 | 0.03 | 0.03 | 0.03 | 0.03 | 0.03 | 0.03 |
| Si | 0.05 | 0.05 | 0.05 | 0.05 | 0.05 | 0.05 | 0.05 |
| Age-hardening temp. [° C.] | 790 | 790 | 790 | 790 | 790 | 790 | 790 |
| Rp 0.2 [ksi] | 117.9 | 117.1 | 101.8 | 111.1 | 102.0 | 101.1 | 146.6 |
| Rm [ksi] | 174.4 | 173.9 | 162.8 | 169.6 | 163.0 | 162.2 | 194.3 |
| Hardness [HRC] | 33 | 33 | 29 | 31 | 29 | 29 | 38 |
| $\gamma'$ [%] | 14 | 16 | 13 | 13 | 12 | 13.7 | 8.02 |
| $\gamma'$ size (nm) | 25.6 | 26.3 | 27 | 27.1 | 28.5 | 28.35 | 23.36 |
| $\gamma''$ [%] | 0 | 0 | 0 | 0 | 0 | 0 | 7.27 |
| $\gamma''$ size (nm) | — | — | — | — | — | — | 68.95 |
| $\gamma'/\gamma''$ proportion | >100 | >100 | >100 | >100 | >100 | >100 | 1.1 |

Based on the results presented above, calculations of the equilibrium phase proportions were performed as a function of the temperature for other chemical compositions that are of interest. In order to find the temperature at which the precipitation is optimized and therefore the superior mechanical properties are achieved, calculations were performed with different age-hardening temperatures. The calculation results are shown in Table 4 and FIG. 5 for the chemical composition LB250643. In the case of the chemical composition LB250643, 690° C. is the peak temperature.

TABLE 4

Phase precipitation and corresponding mechanical properties according to the age-hardening temperature in a model alloy

| Chemical composition of Batch LB 250643 | C | 0.01 |
|---|---|---|
| | N | 0.005 |
| | Cr | 18.47 |
| | Ni | 53.68 |
| | Mo | 3.05 |
| | Ti | 1.22 |
| | Nb | 3.51 |
| | Fe* | 19.32 |
| | P | 0.003 |
| | Al | 0.62 |
| | B | 0.004 |

TABLE 4-continued

Phase precipitation and corresponding mechanical properties according to the age-hardening temperature in a model alloy

| | |
|---|---|
| Ta | 0.01 |
| Co | 0.01 |
| Cu | 0.01 |
| Mn | 0.01 |
| Si | 0.02 |

Age-hardening

| | 650° C./6 h | 670° C./6 h | 690° C./6 h | 710° C./6 h | 730° C./6 h | 750° C./6 h |
|---|---|---|---|---|---|---|
| Temp. | 650 | 670 | 690 | 710 | 730 | 750 |
| Yield stress [ksi] | 144 | 158 | 164 | 159 | 154 | 146 |
| Tensile strength [ksi] | 192 | 202 | 206 | 203 | 200 | 194 |
| Hardness [HRC] | 37 | 40 | 41 | 40 | 39 | 38 |
| γ' [%] | 12 | 13 | 13 | 12 | 12 | 11 |
| γ' size (nm) | 17.66 | 18.38 | 18.34 | 18.41 | 18.72 | 19.54 |
| γ" [%] | 3.14 | 4.31 | 4.16 | 4.00 | 3.80 | 3.57 |
| γ" size (nm) | 11.45 | 13.62 | 18.21 | 23.76 | 31.42 | 40.61 |
| γ'/γ" proportion | 3.82 | 3.02 | 3.13 | 3.00 | 3.16 | 3.08 |

Similar calculations were performed for all other chemical compositions (diagrams in FIGS. 11a-11ab). In order to find the optimized precipitation temperature, experiments were carried out with different and increasing temperatures.

It is to be remarked that the calculated temperature may exhibit a deviation from the experimental temperatures.

The properties of the other chemical compositions that are of interest are summarized together with their peak temperatures in Tables 5.1, 5.2 and 5.3.

If necessary, the alloy may be manufactured and used in the product form of powder. Since the workability of an alloy does not play any role in the additive fabrication methods, an expanded chemical composition window exists with respect to the aluminum contents. For additive fabrication methods, the powder may have a higher aluminum proportion up to 4%. Possible chemical compositions for powder alloy are shown in Table 6.

TABLE 5.1

Chemical compositions, mechanical properties and proportions of the precipitation phases at the peak temperature for alloy variations (Part 1)

| Element | LB 250642 | LB 250643 | LB 250647 | LB 250646 | LB 250650 | LB 250648 | LB 250649 | LB 250680 | LB 250682 | LB 250684 |
|---|---|---|---|---|---|---|---|---|---|---|
| C | 0.014 | 0.01 | 0.015 | 0.014 | 0.014 | 0.014 | 0.014 | 0.011 | 0.011 | 0.014 |
| N | 0.005 | 0.005 | 0.005 | 0.004 | 0.005 | 0.005 | 0.004 | 0.006 | 0.014 | 0.007 |
| Cr | 18.55 | 18.47 | 18.49 | 18.54 | 18.53 | 18.54 | 18.48 | 18.43 | 18.7 | 18.08 |
| Ni | 53.77 | 53.68 | 53.6 | 54.1 | 53.69 | 53.67 | 53.58 | 53.61 | 53.72 | 53.93 |
| Mo | 3.02 | 3.05 | 3.05 | 2.95 | 3.05 | 3.05 | 3.04 | 6.2 | 8.55 | 8.38 |
| Ti | 0.93 | 1.22 | 0.95 | 0.9 | 0.94 | 0.93 | 0.93 | 1.18 | 0.65 | 1.15 |
| Nb | 3.54 | 3.51 | 4.88 (5.01) | 0.01 | 5.1 | 5 (5.01) | 5.11 | 3.53 | 3.52 | 3.8 |
| Fe* | 19.5 | 19.32 | 18.37 | 22.86 | 18.53 | 18.17 | 18.23 | 16.38/R | 14.1/R | 13.91/R |
| P | 0.003 | 0.003 | 0.003 | 0.003 | 0.003 | 0.003 | 0.003 | 0.003 | 0.003 | 0.004 |
| Al | 0.54 | 0.62 | 0.51 | 0.51 | 0.01 | 0.5 | 0.47 | 0.53 | 0.51 | 0.58 |
| B | 0.004 | 0.004 | 0.005 | 0.004 | 0.005 | 0.001 | 0.01 | 0.004 | 0.004 | 0.004 |
| Ta | 0.01 | 0.01 | 0.01 | 0.01 | 0.01 | 0.01 | 0.01 | 0.01 | 0.01 | 0.01 |
| Co | 0.01 | 0.01 | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.02 | 0.02 |
| Mn | 0.01 | 0.01 | 0.01 | 0.01 | 0.01 | 0.01 | 0.01 | 0.01 | 0.1 | 0.02 |
| Si | 0.02 | 0.02 | 0.03 | 0.02 | 0.03 | 0.03 | 0.04 | 0.03 | 0.03 | 0.03 |
| Peak temp/ [° C.] | 690 | 690 | 690 | 690 | 670 | 690 | 680 | 680 | 680 | 680 |
| YS [ksi] | 156 | 164 | 188 | 79 | 202 | 189 | 195 | 170 | 167 | 178 |
| TS [ksi] | 201 | 206 | 223 | 145 | 233 | 224 | 228 | 211 | 208 | 216 |
| Hardness [HRC] | 39 | 41 | 44 | 22 | 46 | 44 | 45 | 42 | 41 | 43 |
| GAMMA' [%] | 9.0 | 13.0 | 9.3 | 4.0 | 3.9 | 9.4 | 8.7 | 12.0 | 7.1 | 12.0 |

TABLE 5.1-continued

Chemical compositions, mechanical properties and proportions of the precipitation phases at the peak temperature for alloy variations (Part 1)

| Element | LB 250642 | LB 250643 | LB 250647 | LB 250646 | LB 250650 | LB 250648 | LB 250649 | LB 250680 | LB 250682 | LB 250684 |
|---|---|---|---|---|---|---|---|---|---|---|
| Gamma" [%] | 4.3 | 4.2 | 8.5 | 0 | 11.5 | 8.5 | 11.0 | 4.8 | 6.1 | 5.4 |
| γ'/γ" proportion | 2.08 | 3.13 | 1.09 | >100 | 0.34 | 1.09 | 0.79 | 2.48 | 1.17 | 221 |

TABLE 5.2

Chemical compositions, mechanical properties and proportions of the precipitation phases at the peak temperature for alloy variations (Part 2)

| Element | LB 250674 | LB 250679 | LB 250678 | LB 250672 | LB 250673 | LB 250681 | LB 250675 | LB 250677 | LB 250676 | LB 250683 |
|---|---|---|---|---|---|---|---|---|---|---|
| C | 0.012 | 0.014 | 0.012 | 0.015 | 0.014 | 0.013 | 0.011 | 0.012 | 0.013 | 0.011 |
| N | 0.007 | 0.007 | 0.006 | 0.004 | 0.005 | 0.006 | 0.006 | 0.006 | 0.006 | 0.006 |
| Cr | 18.49 | 18.49 | 18.49 | 18.61 | 18.46 | 18.41 | 18.42 | 18.34 | 18.48 | 18.43 |
| Ni | 53.32 | 53.68 | 53.7 | 53.62 | 53.82 | 53.6 | 53.71 | 54.02 | 53.74 | 53.06 |
| Mo | 4.09 | 6.16 | 6.17 | 3.91 | 4.09 | 6.17 | 4.15 | 6.12 | 5.92 | 3.73 |
| Ti | 1.19 | 1.22 | 1.57 | 1.48 | 1.51 | 1.54 | 1.5 | 1.93 | 1.86 | 0.97 |
| Nb | 3.49 | 2.8 | 2.71 | 2.22 | 2.73 | 3.7 | 3.58 | 2.07 | 0.28 | 5.02 |
| Fe* | 18.71/R | 16.94/R | 16.67/R | 19.42/R | 18.67/R | 15.85/R | 17.93/R | 16.81/R | 18.33/R | 18.04/R |
| P | 0.003 | 0.003 | 0.003 | 0.003 | 0.003 | 0.003 | 0.003 | 0.003 | 0.003 | 0.02 |
| Al | 0.58 | 0.56 | 0.56 | 0.61 | 0.57 | 0.58 | 0.58 | 0.58 | 1.26 | 0.58 |
| B | 0.005 | 0.004 | 0.005 | 0.005 | 0.004 | 0.004 | 0.005 | 0.004 | 0.004 | 0.004 |
| Ta | 0.01 | 0.01 | 0.01 | 0.01 | 0.01 | 0.01 | 0.01 | 0.01 | 0.01 | 0.01 |
| Co | 0.01 | 0.01 | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 | 0.01 | 0.01 |
| Mn | 0.01 | 0.01 | 0.01 | 0.01 | 0.01 | 0.01 | 0.01 | 0.01 | 0.01 | 0.02 |
| Si | 0.02 | 0.03 | 0.02 | 0.02 | 0.02 | 0.03 | 0.02 | 0.02 | 0.02 | 0.03 |
| Peak temp/ [° C.] | 680 | 700 | 700 | 660 | 700 | 680 | 680 | 640 | 800 | 680 |
| YS [ksi] | 166 | 147 | 150 | 115 | 142 | 174 | 170 | 120 | 118 | 194 |
| TS [ksi] | 208 | 195 | 197 | 172 | 191 | 213 | 210 | 176 | 174 | 227 |
| Hardness [HRC] | 41 | 38 | 39 | 32 | 37 | 42 | 41 | 33 | 33 | 45 |
| GAMMA' [%] | 13.0 | 12.0 | 15.0 | 15.0 | 15.0 | 15.0 | 15.0 | 17.0 | 12.0 | 11.0 |
| Gamma" [%] | 4.1 | 1.9 | 1.6 | 3.0 | 1.3 | 4.2 | 4.1 | 0.0 | 0.0 | 9.0 |
| γ'/γ" proportion | 3.20 | 6.28 | 9.68 | 5.08 | 11.81 | 3.60 | 3.68 | >100 | >100 | 1.22 |

TABLE 5.3

Chemical compositions, mechanical properties and proportions of the precipitation phases at the peak temperature for alloy variations (Part 3)

| Element | LB P01 | LB P02 | LB P03 | LB P04 | LB P05 | LB P06 |
|---|---|---|---|---|---|---|
| C | 0.011 | 0.011 | 0.011 | 0.011 | 0.011 | 0.011 |
| N | 0.005 | 0.005 | 0.005 | 0.005 | 0.005 | 0.005 |
| Cr | 18.5 | 18.5 | 18.5 | 18.5 | 18.5 | 18.5 |
| Ni | 54 | 54 | 54 | 54 | 54 | 54 |
| Mo | 3.05 | 3.05 | 3.05 | 3.05 | 3.05 | 3.05 |
| Ti | 0.95 | 0.95 | 0.95 | 0.95 | 0.95 | 0.95 |
| Nb | 5 | 3.5 | 5 | 3.5 | 5 | 4.2 |
| Fe* | R | R | R | R | R | R |
| P | 0.003 | 0.003 | 0.003 | 0.003 | 0.003 | 0.003 |
| Al | 1.2 | 1.2 | 1.8 | 1.8 | 1.5 | 1.2 |
| B | 0.002 | 0.002 | 0.002 | 0.002 | 0.002 | 0.002 |
| Ta | 0.01 | 0.01 | 0.01 | 0.01 | 0.01 | 0.01 |
| Co | 0.01 | 0.01 | 0.01 | 0.01 | 0.01 | 0.01 |
| Cu | 0.01 | 0.01 | 0.01 | 0.01 | 0.01 | 0.01 |
| Mn | 0.01 | 0.01 | 0.01 | 0.01 | 0.01 | 0.01 |
| Si | 0.03 | 0.03 | 0.03 | 0.03 | 0.03 | 0.03 |
| Peak temp/ [° C.] | 690 | 690 | 690 | 670 | 690 | 690 |
| YS [ksi] | 172 | 134 | 142 | 88 | 163 | 158 |
| TS [ksi] | 212 | 186 | 191 | 152 | 206 | 202 |

TABLE 5.3-continued

Chemical compositions, mechanical properties and proportions of the precipitation phases at the peak temperature for alloy variations (Part 3)

| Element | LB P01 | LB P02 | LB P03 | LB P04 | LB P05 | LB P06 |
|---|---|---|---|---|---|---|
| Hardness [HRC] | 42 | 36 | 37 | 25 | 41 | 40 |
| GAMMA' [%] | 16.41 | 17.34 | 24.62 | 24.03 | 20.83 | 16.31 |
| Gamma" [%] | 6.2 | 1.7 | 2.5 | 0 | 5.0 | 4.2 |
| γ'/γ" proportion | 2.66 | 10.02 | 9.77 | 100 | 4.21 | 3.88 |

TABLE 6

Possible powder compositions.

| Element | LB P07 | LB P08 | LB P09 | LB P10 | LB P11 | LB P12 | LB P12 | LB P12 |
|---|---|---|---|---|---|---|---|---|
| C | 0.011 | 0.011 | 0.011 | 0.011 | 0.011 | 0.011 | 0.011 | 0.011 |
| N | 0.012 | 0.012 | 0.012 | 0.012 | 0.012 | 0.012 | 0.012 | 0.012 |
| Cr | 18.5 | 18.5 | 18.5 | 18.5 | 18.5 | 18.5 | 18.5 | 18.5 |
| Ni | 54 | 54 | 54 | 54 | 54 | 54 | 54 | 54 |
| Mo | 3.05 | 3.05 | 3.05 | 3.05 | 3.05 | 3.05 | 3.05 | 3.05 |
| Ti | 0.95 | 0.95 | 0.95 | 0.95 | 0.95 | 0.95 | 0.95 | 0.5 |
| Nb | 5 | 4.2 | 3.5 | 5 | 4.2 | 3.5 | 3.5 | 3.5 |
| Fe* | R | R | R | R | R | R | R | R |
| P | 0.003 | 0.003 | 0.003 | 0.003 | 0.003 | 0.003 | 0.003 | 0.003 |
| Al | 2.5 | 2.5 | 2.5 | 3.5 | 3.5 | 3.5 | 4 | 4 |
| B | 0.004 | 0.004 | 0.004 | 0.004 | 0.004 | 0.004 | 0.004 | 0.004 |
| Ta | 0.001 | 0.001 | 0.001 | 0.001 | 0.001 | 0.001 | 0.001 | 0.001 |
| Co | 0.01 | 0.01 | 0.01 | 0.01 | 0.01 | 0.01 | 0.01 | 0.01 |
| Cu | 0.01 | 0.01 | 0.01 | 0.01 | 0.01 | 0.01 | 0.01 | 0.01 |
| Mn | 0.01 | 0.01 | 0.01 | 0.01 | 0.01 | 0.01 | 0.01 | 0.01 |
| Si | 0.02 | 0.02 | 0.02 | 0.02 | 0.02 | 0.02 | 0.02 | 0.02 |

According to the results of these calculations, the gamma" phase proportion can be doubled by an increase of the niobium content from approximately 3.5 to 5% when the titanium and aluminum contents are kept constant. When the aluminum and niobium (tantalum) contents are kept constant and the titanium content is increased, more gamma' phase is formed, wherein an improvement of the mechanical properties is expected. With an aluminum increase, more gamma' phase can be precipitated, in combination with the same or lower Ti and Nb contents (in comparison with alloy 718).

At extremely low niobium (tantalum) contents (<1%) and constant aluminum content (~0.6%), no gamma" phase is formed and so, according to the calculations, the mechanical properties are not satisfactory.

Changes of the molybdenum, tungsten, boron and phosphorus contents have no direct and representative influence on the gamma' and gamma" phase precipitates.

FIGS. 5 and 6 contain phase diagrams that show the precipitation of gamma' phase below 919° C. and of gamma" phase below 880° C. for the chemical composition LB250643 (with high titanium and aluminum contents combined with low niobium (tantalum) content).

The phase diagram from FIG. 5 shows computationally the formation of precipitation phases below 919° C. and takes into consideration only the thermodynamic stability. Therefore no gamma" phase is considered in the phase diagram. Delta phase is the thermodynamically most stable precipitation phase, but it is formed slowly because of the precipitation kinetics. According to the thermodynamic calculations, the eta phase content is not substantially present for this composition.

The TTT (Time Temperature Transformation) diagram for the chemical composition LB250643 is illustrated in FIG. 6.

In this case, the presence of the gamma" phase is now considered. As expected, delta and eta phases are precipitated after longer annealing duration at the age-hardening temperature, and so the precipitations of these phases are influenced by the annealing duration of the age-hardening. Although no difference was seen between the numerical tension tests for the gamma/delta system with and without hydrogen, the general behavior of the gamma/delta phase boundaries may nevertheless be critical, due to the low atomic bonding energy. Therefore the annealing duration of the age-hardening should be limited to at most 60 hours, in order to prevent the formation of the delta phase.

The contents of boron and phosphorus have no influence on the proportions of gamma' or gamma" phases. A change of the contents of aluminum, niobium (tantalum) and titanium has a direct influence on the formation of gamma' and gamma".

In order to understand the formation of the age-hardening phases quantitatively, calculations were performed for the chemical composition LB250643. The calculations for the corresponding chemical composition were performed as the first-stage age-hardening temperature at 650° C. (below the peak temperature). Thereafter a second-stage age-hardening was carried out at varied temperatures. Similar calculations were made for the peak temperature as the first-stage age-hardening temperature and for 730° C. (above the peak temperature) as the first-stage age-hardening temperature, wherein the second-stage temperature was varied in increments of 20 degrees. The results are shown in Table 7 and in FIG. 7.

It is to be remarked that the age-hardening temperature has an influence on the phase proportions. An example for the chemical composition LB250643 is given in FIG. 8. FIG.

8 shows the isothermal diagram for this chemical composition during the age-hardening at 650° C., where the maximum phase proportion of gamma' is attained after approximately 7 hours. When the temperature is raised to 730° C., the time at which the maximum gamma' phase proportion is reached becomes shorter. FIG. 9 shows the isothermal diagram of this chemical composition during the age-hardening at 730° C.

TABLE 7

Proportion of the age-hardening phases and mechanical properties after different 2-stage age-hardenings of LB250643

| | | | | | | | | |
|---|---|---|---|---|---|---|---|---|
| 1-Stage temperature | 650 | 650 | 650 | 650 | 650 | 650 | 650 | 650 |
| 2-Stage temperature | 550 | 570 | 590 | 610 | 630 | 670 | 690 | 710 |
| γ' after 1 stage (%) | 12 | 12 | 12 | 12 | 12 | 12 | 12 | 12 |
| γ' size after 1 stage (nm) | 19 | 19 | 19 | 19 | 19 | 18 | 18 | 19 |
| γ' after 2 stage (%) | 1.8 | 2.4 | 2.2 | 2.1 | 1.9 | 1.4 | 1.1 | 0.8 |
| γ' size after 2 stage (nm) | 19 | 19 | 19 | 19 | 19 | 18 | 18 | 19 |
| γ" after 1 stage (%) | 3.1 | 3.1 | 3.1 | 3.1 | 3.1 | 3.1 | 3.1 | 3.1 |
| γ" size after 1 stage (nm) | 12 | 12 | 13 | 13 | 14 | 19 | 23 | 28 |
| γ" after 2 stage (%) | 0.6 | 0.9 | 1.2 | 1.5 | 1.4 | 1.2 | 1.0 | 0.9 |
| γ" size after 2 stage (nm) | 12 | 12 | 13 | 13 | 14 | 19 | 23 | 28 |
| Yield stress (ksi) | 156 | 159 | 161 | 162 | 163 | 167 | 163 | 158 |
| Tensile strength (ksi) | 201 | 203 | 204 | 205 | 205 | 208 | 205 | 202 |
| Hardness (HRC) | 39 | 40 | 40 | 40 | 41 | 40 | 40 | 40 |
| Total gamma' | 32.3 | 33.2 | 32.9 | 32.7 | 32.5 | 31.9 | 31.6 | 31.4 |
| Total gamma" | 15.9 | 16.4 | 17.1 | 17.8 | 18.5 | 22.8 | 26.9 | 32.4 |
| γ'/γ"proportion | 2.040 | 2.023 | 1.918 | 1.843 | 1.759 | 1.397 | 1.172 | 0.968 |
| 1-Stage temperature | 690 | 690 | 690 | 690 | 690 | 690 | 690 | 690 |
| 2-Stage temperature | 530 | 550 | 570 | 590 | 610 | 630 | 650 | 670 |
| γ' after 1 stage (%) | 13 | 13 | 13 | 13 | 13 | 13 | 13 | 13 |
| γ' size after 1 stage (nm) | 19 | 19 | 19 | 19 | 19 | 19 | 19 | 19 |
| γ' after 2 stage (%) | 1.1 | 1.4 | 1.3 | 1.1 | 0.9 | 0.9 | 0.5 | 0.3 |
| γ' size after 2 stage (nm) | 19 | 19 | 19 | 19 | 19 | 19 | 19 | 19 |
| γ" after 1 stage (%) | 4.2 | 4.2 | 4.2 | 4.2 | 4.2 | 4.2 | 4.2 | 4.2 |
| γ" size after 1 stage (nm) | 19 | 19 | 19 | 19 | 19 | 20 | 21 | 23 |
| γ" after 2 stage (%) | 0.2 | 0.4 | 0.5 | 0.5 | 0.5 | 0.4 | 0.3 | 0.1 |
| γ" size after 2 stage (nm) | 19 | 19 | 19 | 19 | 19 | 20 | 21 | 23 |
| Yield stress (ksi) | 175 | 176 | 176 | 176 | 174 | 172 | 169 | 165 |
| Tensile strength (ksi) | 213 | 214 | 2015 | 214 | 213 | 211 | 209 | 207 |
| Hardness (HRC) | 42 | 42 | 42 | 42 | 42 | 42 | 41 | 40 |
| Total gamma' | 32.9 | 33.4 | 33.2 | 32.9 | 32.7 | 32.6 | 32.1 | 31.9 |
| Total gamma" | 23.0 | 23.3 | 23.6 | 23.7 | 23.8 | 24.2 | 25.1 | 27.1 |
| γ'/γ"proportion | 1.433 | 1.434 | 1.406 | 1.388 | 1.373 | 1.348 | 1.278 | 1.178 |
| 1-Stage temperature | 730 | 730 | 730 | 730 | 730 | 730 | 730 | 730 |
| 2-Stage temperature | 570 | 590 | 610 | 630 | 650 | 670 | 690 | 710 |
| γ' after 1 stage (%) | 12 | 12 | 12 | 12 | 12 | 12 | 12 | 12 |
| γ' size after 1 stage (nm) | 20 | 20 | 20 | 19 | 19 | 19 | 19 | 19 |
| γ' after 2 stage (%) | 2.0 | 1.8 | 1.7 | 1.5 | 1.3 | 1.0 | 0.7 | 0.4 |
| γ' size after 2 stage (nm) | 20 | 20 | 20 | 19 | 19 | 19 | 19 | 19 |
| γ" after 1 stage (%) | 3.8 | 3.8 | 3.8 | 3.8 | 3.8 | 3.8 | 3.8 | 3.8 |
| γ" size after 1 stage (nm) | 32 | 33 | 33 | 33 | 33 | 34 | 35 | 38 |
| γ" after 2 stage (%) | 0.3 | 0.5 | 0.6 | 0.7 | 0.6 | 0.5 | 0.4 | 0.2 |
| γ" size after 2 stage (nm) | 32 | 33 | 33 | 33 | 33 | 34 | 35 | 38 |
| Yield stress (ksi) | 167 | 167 | 167 | 166 | 165 | 162 | 159 | 154 |
| Tensile strength (ksi) | 208 | 208 | 208 | 208 | 207 | 205 | 202 | 199 |
| Hardness (HRC) | 41 | 41 | 41 | 41 | 41 | 40 | 40 | 39 |
| Total gamma' | 33.7 | 33.4 | 33.2 | 33.0 | 32.7 | 32.3 | 32.0 | 31.9 |
| Total gamma" | 36.4 | 36.9 | 37.5 | 37.9 | 37.8 | 38.2 | 39.4 | 41.9 |
| γ'/γ"proportion | 0.924 | 0.905 | 0.885 | 0.870 | 0.864 | 0.846 | 0.813 | 0.760 |

A difference between the calculated and the experimental peak temperatures will be expected and is known. In order to learn which deviation exists for these analysis limits, the peak temperature was verified by means of heat treatment and hardness tests. The diagram of the experimentally determined values for the chemical composition LB250643 is shown in FIG. 10. For this chemical composition, a deviation of 80° C. exists; a difference that must be taken into consideration in the heat treatment design.

Experimental Results

In order to confirm the hydrogen embrittlement mechanisms, laboratory experiments were carried out on the laboratory melt with chemical analyses according to LB 250646, LB 250647, LB 250650, and LB 250642. Slow load tests under cathodic polarization according to NACE Publication 3948 from the year 2014 were carried out in the above-mentioned melts. The results are added in Table 8.

The slow load tests prove the theoretical mechanism, wherein the presence or prevalence of gamma" is harmful for the resistance of the material to hydrogen embrittlement, since the alloys without Nb and with low Nb content (and therefore with a prevalence of gamma') have zero or almost zero tendency to hydrogen embrittlement, as is shown with the higher elongation at break ratios.

TABLE 8

Results of slow load tests according to NACE Publication 3948 in 4 of the chemical analyses (LB 250646: Reference, LB 250647: without Nb, LB 250650: without Al, and LB 250642: with low Nb content)

| Analysis | Test condition | Sample no. | Elongation at break [%] | Ratio [%] | Time to break min | Ratio [%] | Rm MPa | Ratio [%] |
|---|---|---|---|---|---|---|---|---|
| LB 250646 | inert | A1 | 20.3 | — | 4657 | — | 1109 | — |
| | aggressive | A2 | 13.2 | 65 | 3295 | 71 | 1118 | 101 |
| | aggressive | A3 | 13.2 | 65 | 3448 | 74 | 1092 | 98 |
| | aggressive | A4 | 13 | 64 | 3375 | 72 | 1062 | 96 |
| | Average | | | 65 | | 72 | | 98 |
| LB 250647 | inert | B1 | 40.9 | — | 9098 | — | 535 | — |
| | aggressive | B2 | 44.9 | 110 | 9283 | 102 | 586 | 110 |
| | aggressive | B3 | 44.8 | 110 | 9442 | 104 | 487 | 91 |
| | aggressive | B4 | 43 | 105 | 9039 | 99 | 513 | 96 |
| | Average | | | 108 | | 102 | | 99 |
| LB 250650 | inert | C1 | 17.8 | — | 4222 | — | 1108 | — |
| | aggressive | C2 | 9.3 | 52 | 2524 | 60 | 1094 | 99 |
| | aggressive | C3 | 10 | 56 | 2450 | 58 | 1088 | 98 |
| | aggressive | C4 | 7.8 | 44 | 2055 | 49 | 1038 | 94 |
| | Average | | | 51 | | 55 | | 97 |
| LB 250642 | inert | D1 | 30.5 | — | 6343 | — | 973 | — |
| | aggressive | D2 | 28.4 | 93 | 5934 | 94 | 937 | 96 |
| | aggressive | D3 | 26.2 | 86 | 5838 | 92 | 882 | 91 |
| | aggressive | D4 | 31 | 102 | 6213 | 98 | 895 | 92 |
| | Average | | | 94 | | 95 | | 93 |

The batch with the precipitation of only gamma" (LB 250650, without Al) has the poorest resistance to hydrogen embrittlement.

The claimed limits for the alloy according to the invention can therefore be justified in detail as follows:

Iron reduces the costs and should then be used. Therefore 12% is the lower limit for iron. However, iron cannot be used excessively, due to the deterioration of the material properties. Therefore 24% is to be regarded as the upper limit. If necessary, iron may be substituted by cobalt.

A minimum content of 17% chromium increases the room-temperature strength and simultaneously ensures the general corrosion resistance. In combination with the carbon, chromium carbides are formed, which may increase the high-temperature strength. Too high chromium contents detract from the phase stability of the alloy and promote the formation of harmful phases, thus negatively influencing the ductility and toughness, and so a chromium content of 21% represents the upper limit.

Higher molybdenum contents increase the pitting corrosion resistance in chloride-containing media. The resistance to stress corrosion cracking at higher temperatures is also expanded with an increase of the minimum content of molybdenum from 0.001 to 3%. As the upper limit, 9% is set, since the metal costs are also significantly influenced by molybdenum additions.

Tungsten may be used as a substituting element for molybdenum and is then also limited to >0 to 9%.

A combination of molybdenum+tungsten is likewise conceivable, wherein a W proportion of at least 0.01% is proposed.

The formation of the intermetallic age-hardening precipitation phase gamma' increases due to the increase of the proportion of Al+Ti. Therefore a minimum content of 0.4% aluminum is necessary. However, if the content of aluminum is too high, it aggregates and coarsens the gamma' phase at the grain boundaries, whereby the mechanical properties are drastically impaired and the hot workability deteriorates. The Al content may be set higher for a powder alloy for additive fabrication methods, since the associated processes do not need any hot working. Aluminum is therefore limited to 4.0%.

Titanium is combined with aluminum and nickel to the gamma' phase and constitutes a contribution to the precipitation strength of the alloy. Nevertheless, eta phase may be formed if titanium is incorporated excessively, whereby the mechanical properties are impaired. Therefore titanium may be added up to 3.0%.

Niobium (or tantalum) stabilizes the gamma' phase and contributes to the strength increase. A minimum content of 1% is therefore necessary. However, niobium (or tantalum) is also responsible for the formation of the gamma" phase, which is harmful for the hydrogen embrittlement resistance and must therefore be controlled. For this reason, niobium (or tantalum) is limited to 1% to 5.7%.

Boron and phosphorus have the effect of suppressing an excessive accumulation of hydrogen at the phase and grain boundaries. Herewith the sensitivity of the hydrogen embrittlement can be reduced. Nevertheless, the grain boundary segregations become too great when boron and phosphorus are used excessively, and the effect of the reduction of the hydrogen embrittlement is lost. The workability may also be restricted, and so boron is limited to 0.001% up to at most 0.01% and phosphorus to 0.001% up to at most 0.02%.

Cobalt may substitute for nickel, and it leads to improvement of the properties at elevated temperatures. The alloy may contain up to 3% cobalt.

Carbon is limited to at most 0.045%, since this element at that content reduces the processability by the excessive formation of carbides.

Copper is limited to at most 0.23%, since this element reduces the oxidation resistance.

The rest of the alloy is nickel (50-55%), and it is to be taken into consideration that the rest contains small proportions of impurities, which do not substantially change the properties of the alloy. Thus impurities such as sulfur may be present in a total proportion of 0.01%. Manganese and silicon are limited to at most 0.35%.

The heat treatment design is extremely important for controlling and modeling the phase precipitates. The limits of the heat treatment parameters for the alloy according to the invention can therefore be justified in detail as follows:

Precipitation phases are formed below 970° C. for the possible limits of the chemical compositions, and so the alloy is solution annealed for between 0.1 h and 60 h, in order to bring all phases into solution, depending on the dimensions of the product forms. The solution annealing temperature is limited to max. 1150° C., in order to restrict the grain growth. In order to prevent precipitates from forming after the solution annealing, a rapid cooling in the moving annealing atmosphere, in inert gas, water, polymer or in oil is proposed.

Thereafter an age-hardening annealing is carried out, in order to form the precipitation phases and to achieve good mechanical properties. For this purpose the material is annealed in the temperature range of 600° C. to 900° C. for 0.1 h to 60 h. Longer age-hardening times lead to delta and eta phase precipitates and should be avoided.

If necessary, an age-hardening may be carried out in a second stage in the temperature range of 550° C. to 900° C. for 0.1 h to 60 h.

The age-hardening temperatures are selected as a function of the application. Age-hardening processes that optimize the mechanical properties are reserved for applications where superior mechanical properties are required. Age-hardening processes that optimize the ratio of the gamma'/gamma" phase proportions are used for applications where superior hydrogen embrittlement resistance is required.

One-stage age-hardenings lead to higher gamma'/gamma" phase ratios and poorer mechanical properties.

Two-stage age-hardenings may lead to different structures having different mechanical properties, depending on the selected first-stage and second-stage temperatures.

If the first-stage temperature is equal to the said peak temperature, the age-hardening leads to the superior mechanical properties, even though the ratio of the gamma'/gamma" phase proportions according to the calculations is lower.

A 2-stage age-hardening with the first temperature above the peak temperature leads to medium mechanical properties. In this case the ratios of the gamma'/gamma" phase proportions are lower, i.e. this leads to poorer hydrogen embrittlement resistance.

If the first-stage temperature lies under the peak temperature and the second-stage temperature is lower than the first-stage temperature, the mechanical properties are poorer than the properties that can be attained via a single stage age-hardening. However, the ratio of the gamma'/gamma" phase proportions may be higher and therefore this heat treatment would be used for applications where the superior requirements of hydrogen embrittlement resistance is the main objective. On the other hand, superior mechanical properties may be attained if the first-stage temperature lies under the peak temperature and the second-stage temperature is higher than the first temperature. The ratio of the gamma'/gamma" phase proportions remains at the same level.

Attention is also to be paid to the age-hardening duration. For low-temperature age-hardening, longer age-hardening times are needed in order to precipitate all precipitates, whereas short age-hardening durations are adequate for higher-temperature age-hardenings.

With the alloy according to the invention or respectively the heat treatment according to the invention (solution annealing and age-hardening annealing), the following properties can be achieved: the ratio of elongation at break in the acid gas test (NACE Publication 3948) lies above 75%, but preferably above 90%, while the yield stresses in air are >100 KSI, preferably 120 KSI.

DESCRIPTION OF THE FIGURES

FIG. 5': Phase diagram of the analysis of LB250643;

Figure 1:
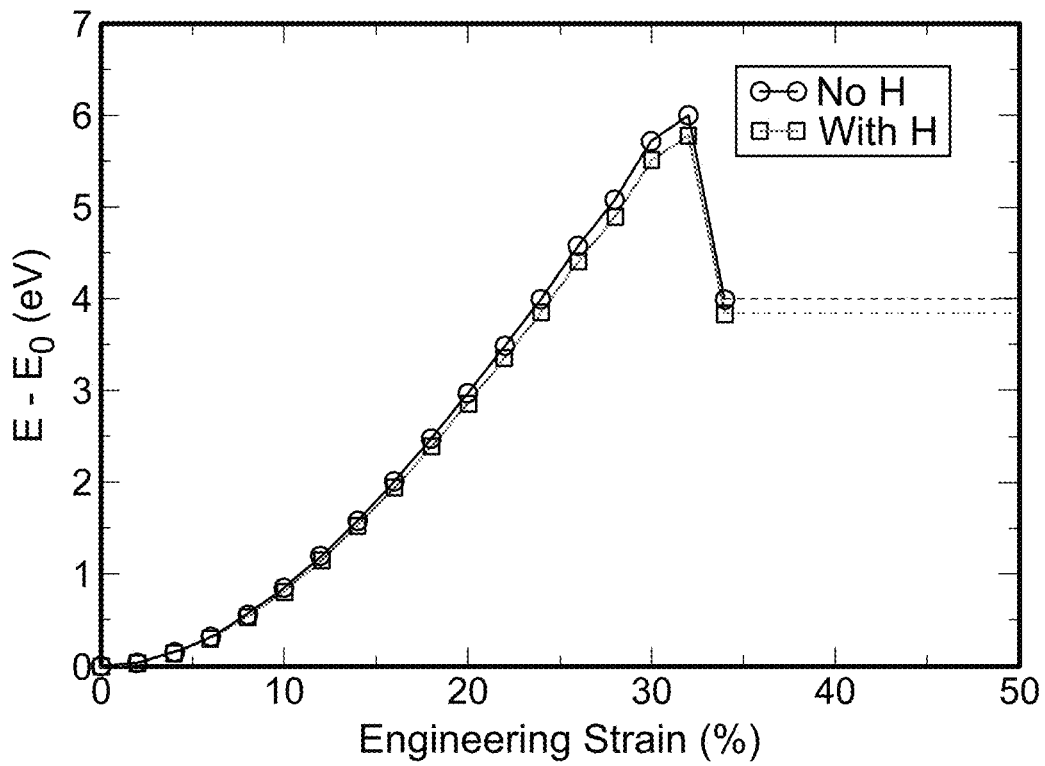
FIG. 1: Energy as a function of elongation as the numerical tension test for the gamma/gamma' system without (black line) and with (red line) hydrogen atom.
Figure 2:
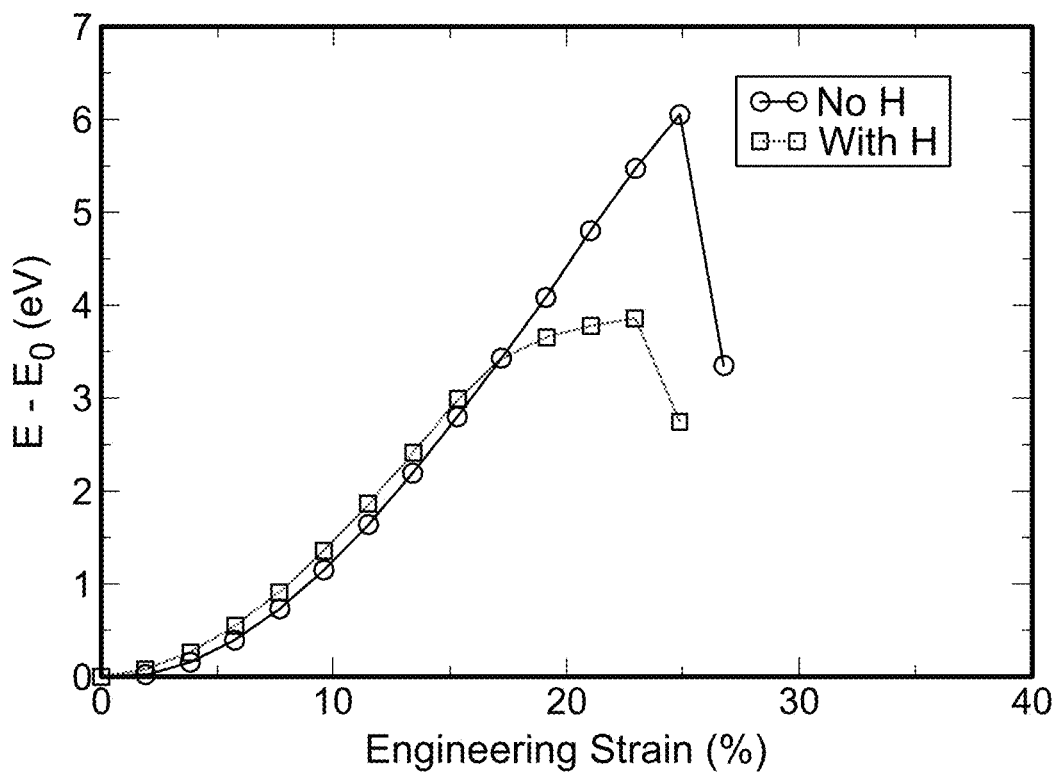
FIG. 2: Energy as a function of elongation as the numerical tension test for the gamma/gamma" system without (black line) and with (red line) hydrogen atom.
Figure 3:
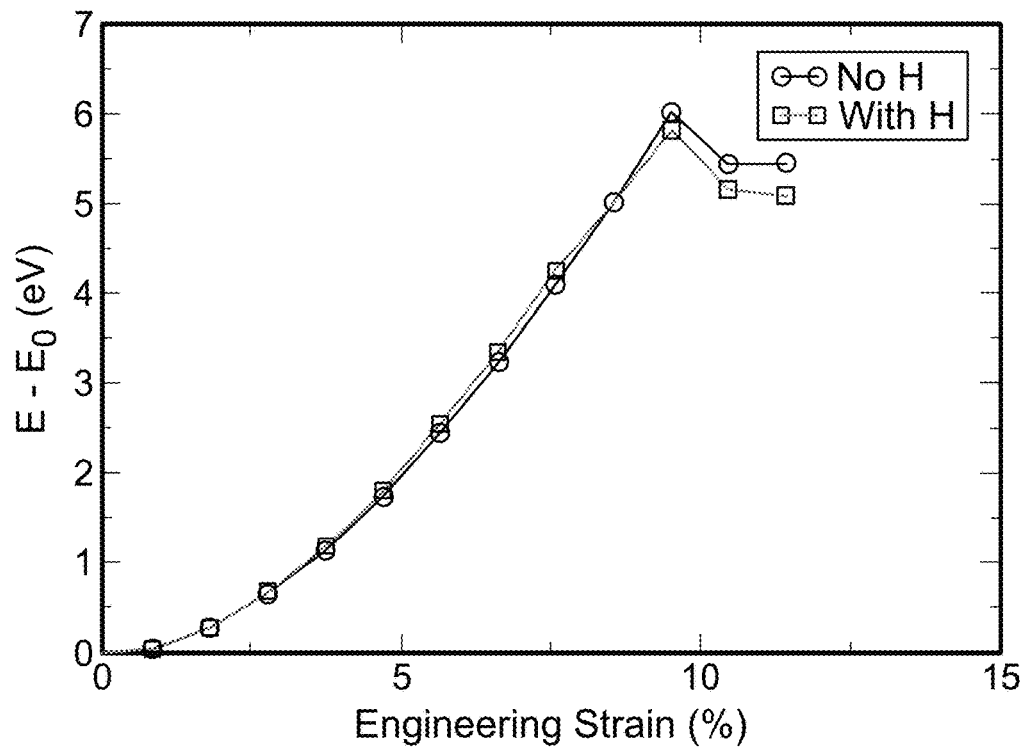
FIG. 3: Energy as a function of elongation as the numerical tension test for the gamma/delta system without (black line) and with (red line) hydrogen atom.
Figure 4:
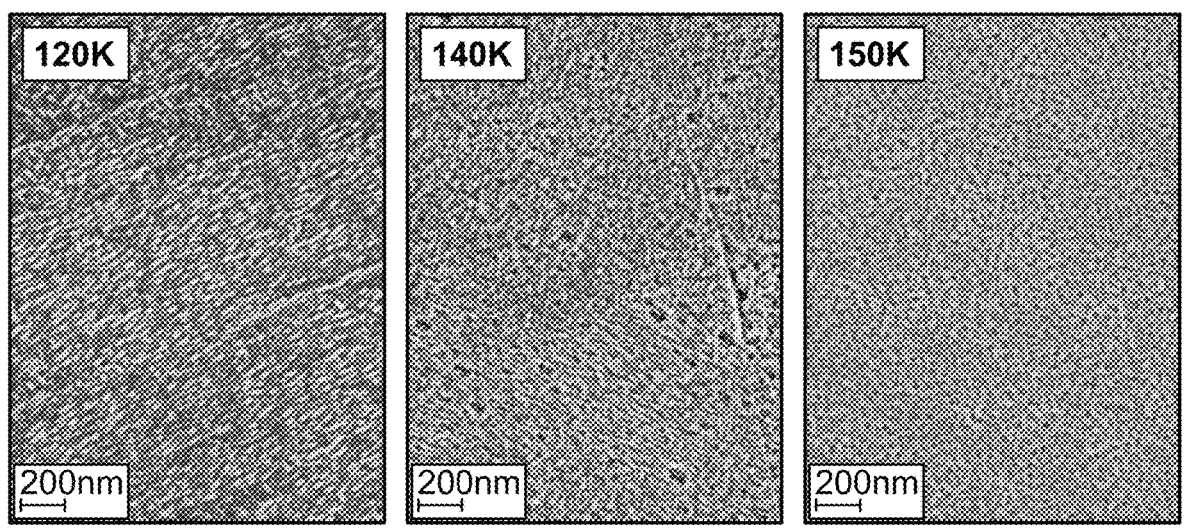
FIG. 4: SEM photos of material corresponding to the 120K, 140K and 150 K variants of alloy 718.
Figure 5:
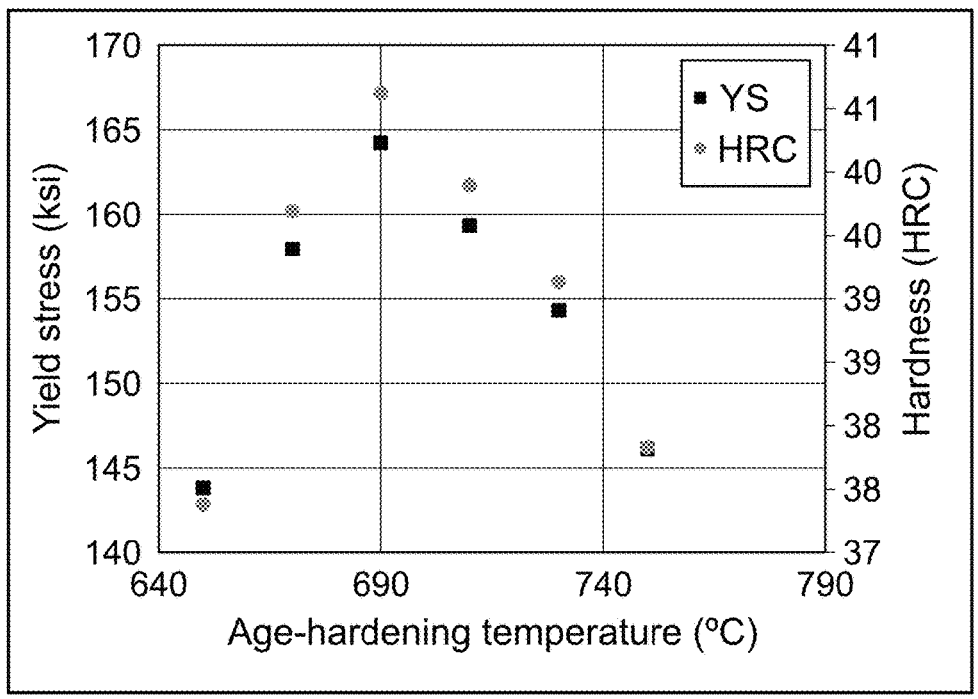
FIG. 5: Mechanical properties as a function of the age-hardening temperature of LB250643.
Figure 5:
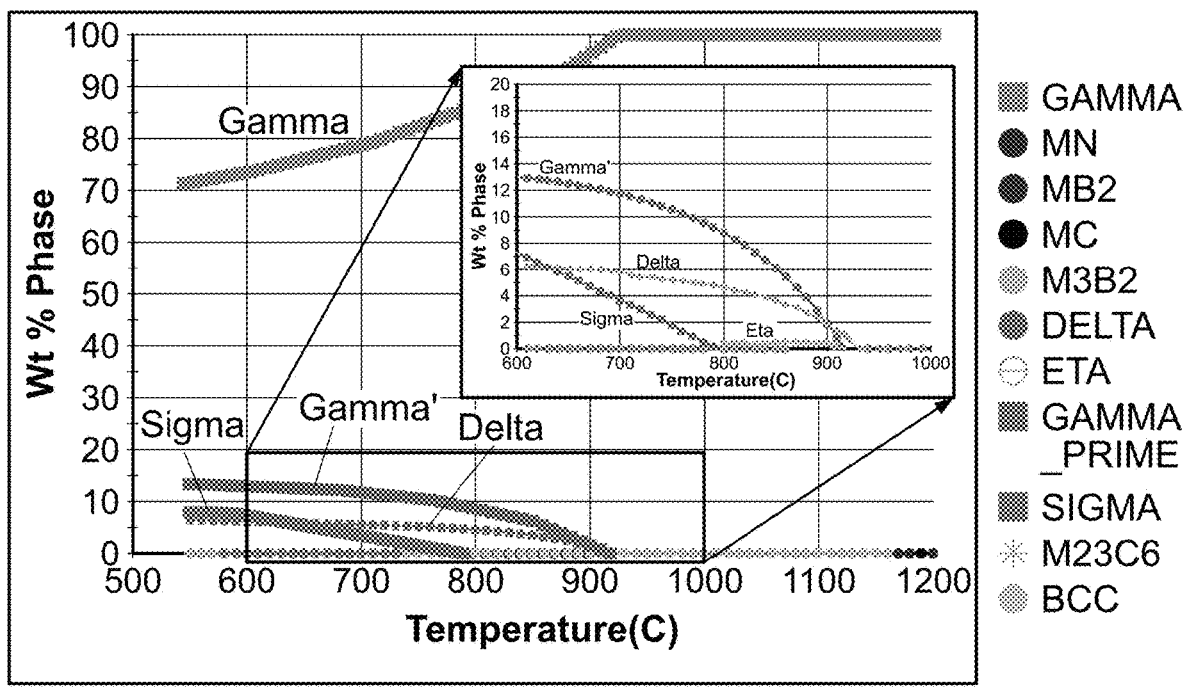
Figure 6:
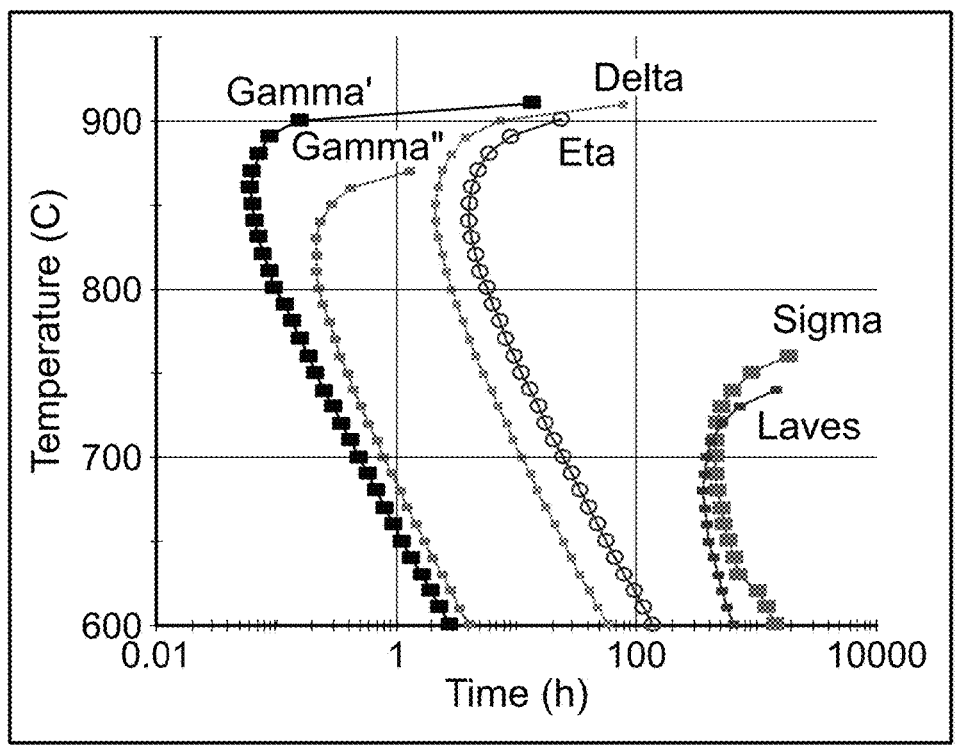
FIG. 6: TTT (Time Temperature Transformation) diagram of the analysis of LB250643.
Figure 7:
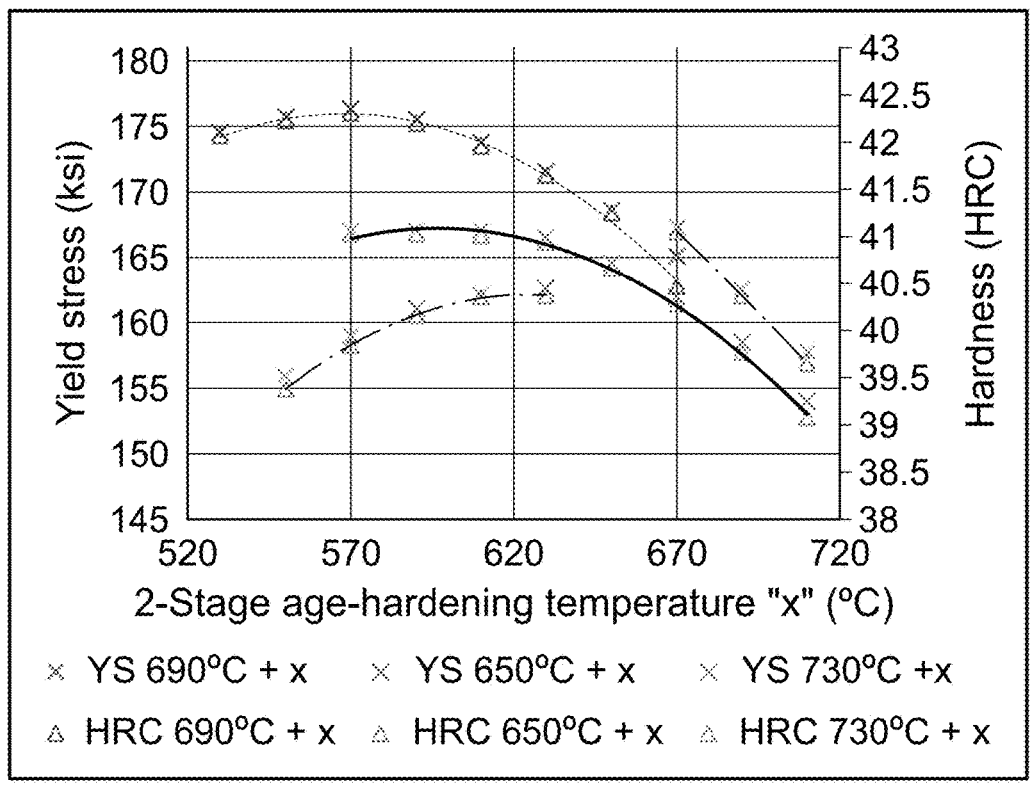
FIG. 7: Calculated mechanical properties after 2-stage age-hardening with the chemical composition LB250643.
Figure 8:
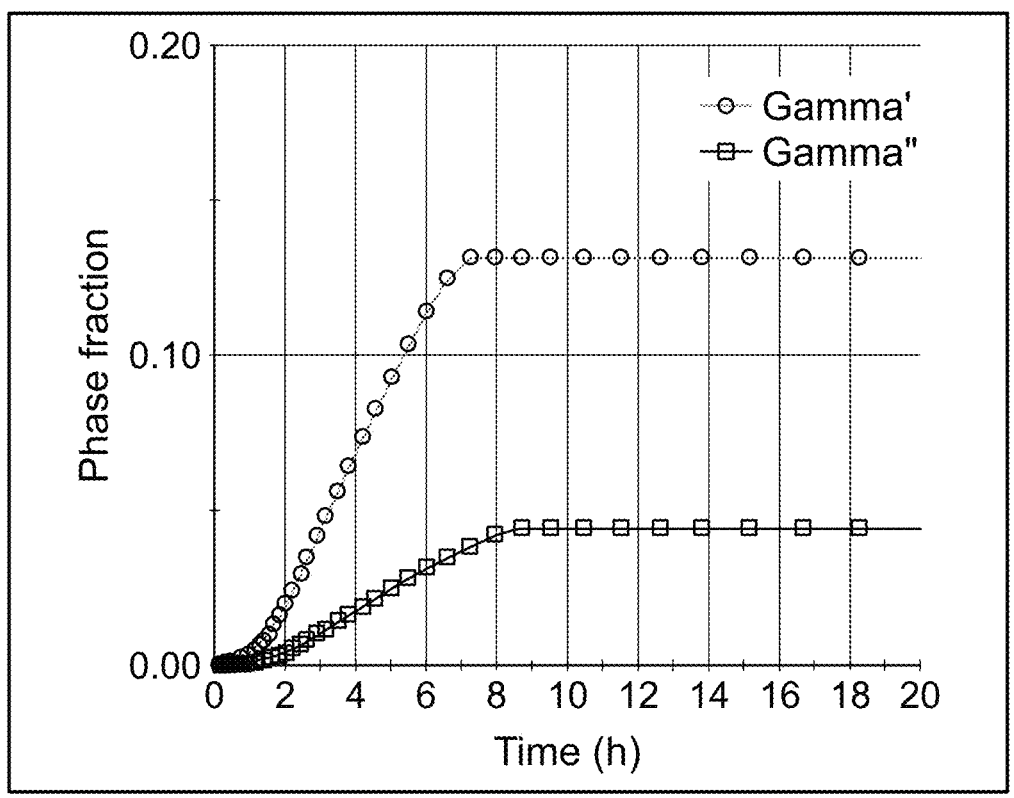
FIG. 8: Isothermal diagram of this chemical composition LB250643 during the age-hardening at 650° C. Gamma' precipitation proportion is represented by the red circles, while the gamma" precipitation proportion is represented by the blue rectangles.
Figure 9:
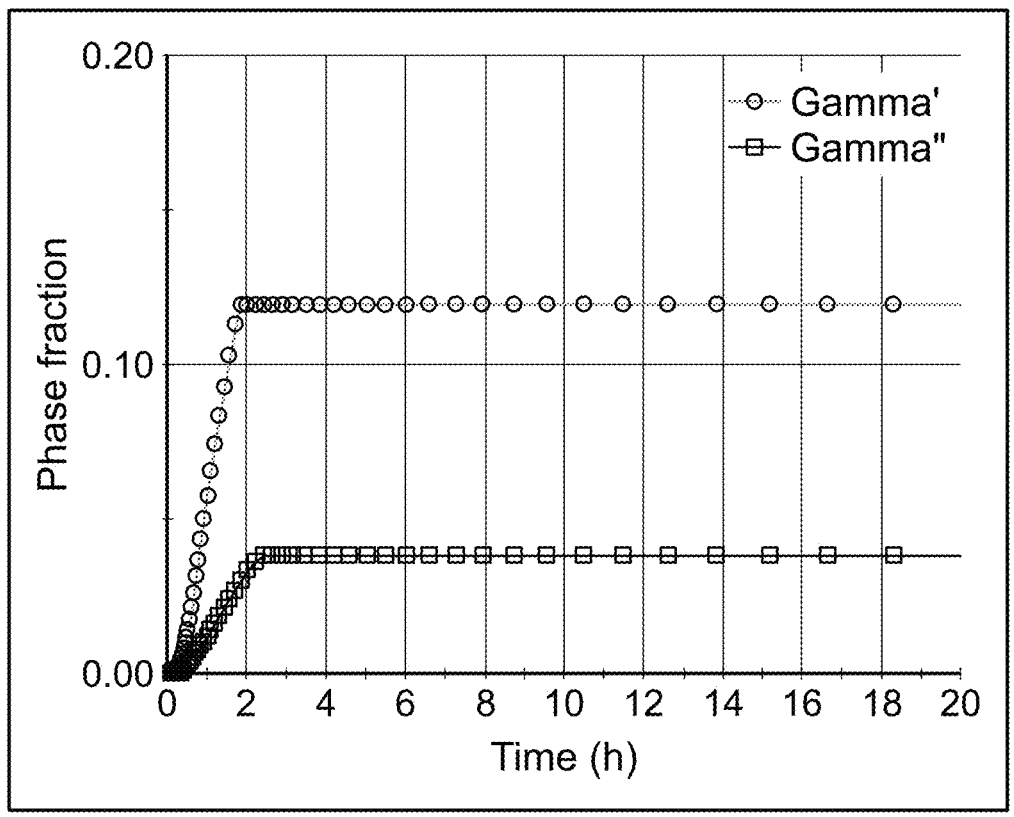
FIG. 9: Isothermal diagram of this chemical composition LB250643 during the age-hardening at 730° C. Gamma' precipitation proportion is represented by the red circles, while the gamma" precipitation proportion is represented by the blue rectangles.
Figure 10:
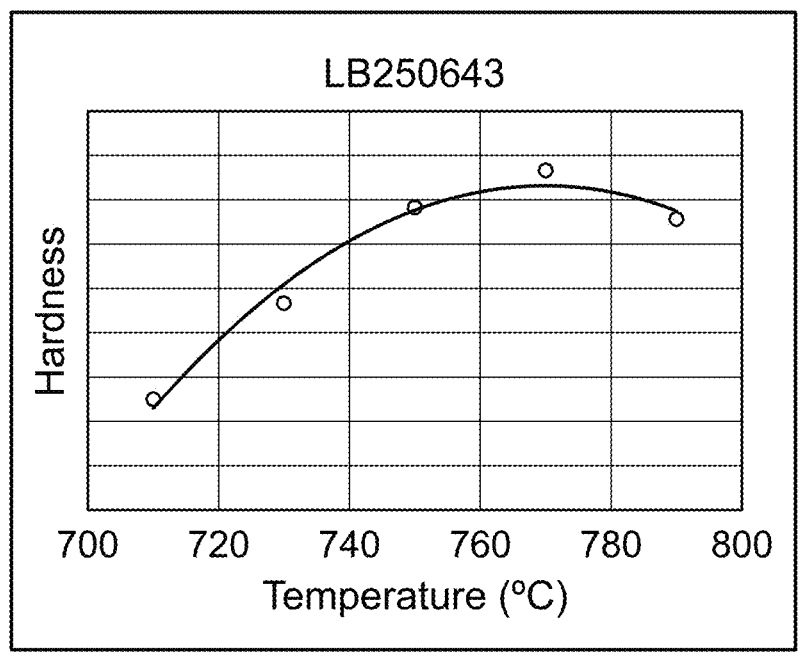
FIG. 10: Experimental hardness curve as a function of age-hardening temperature for the chemical composition LB250643.
Figure 11A:
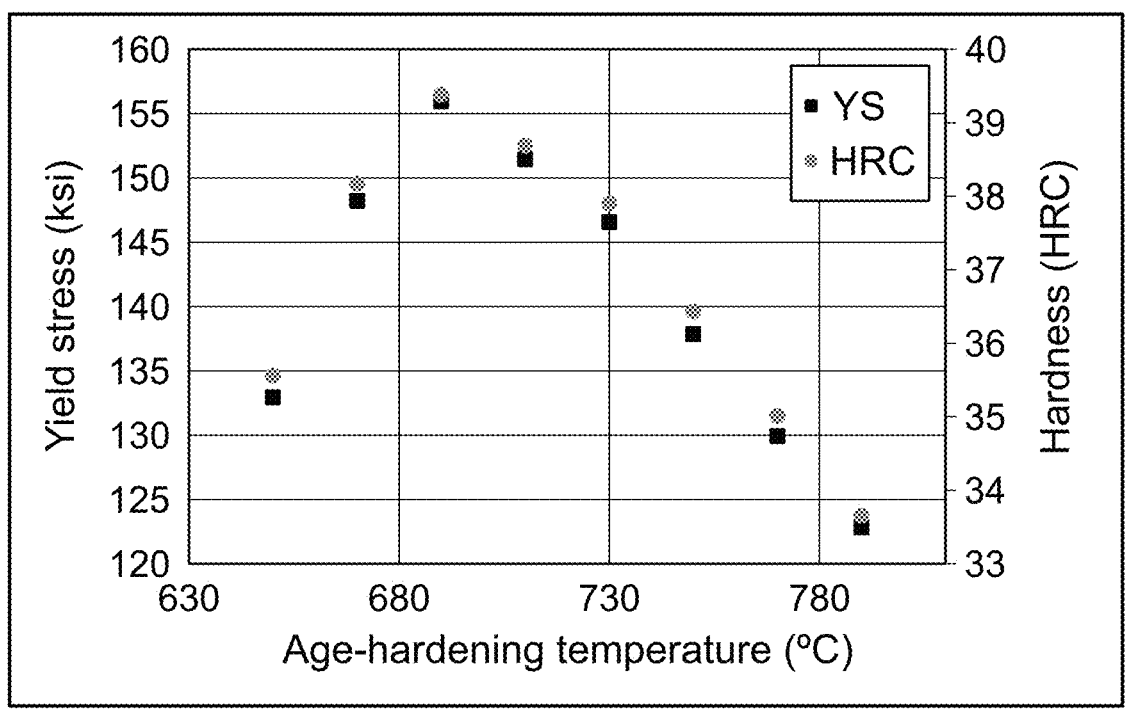
FIGS. 11*a*-11*ab*: Mechanical properties as a function of the age-hardening temperature for several alloy variants.
Figure 11B:
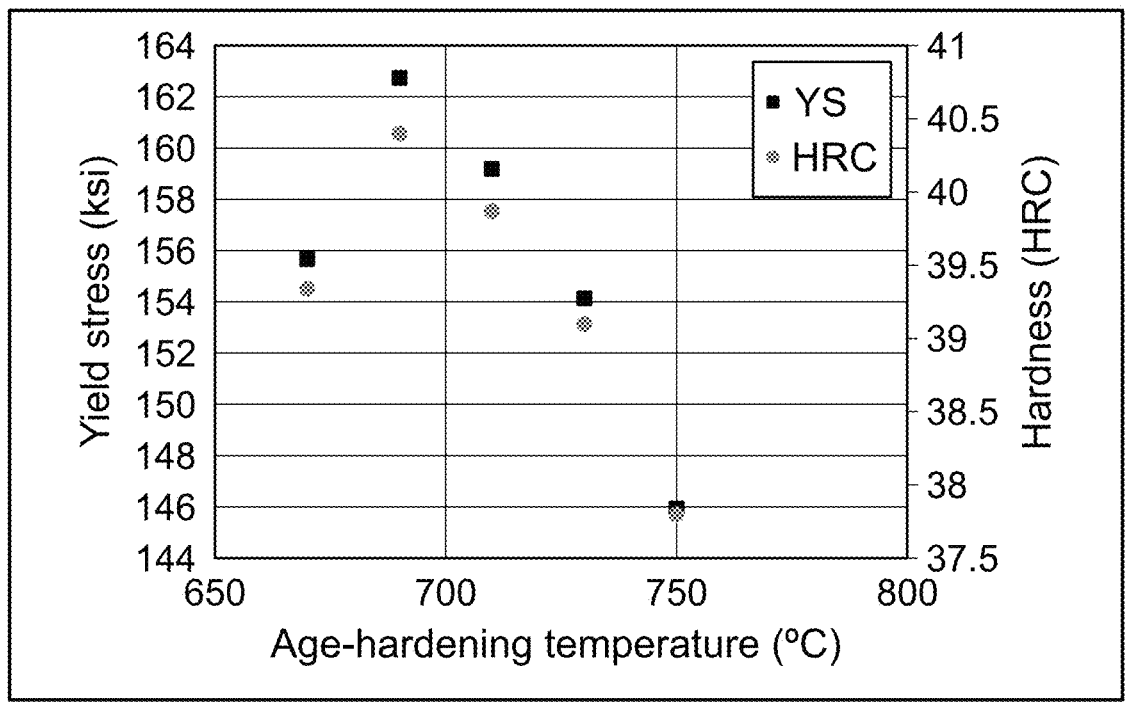
Figure 11C:
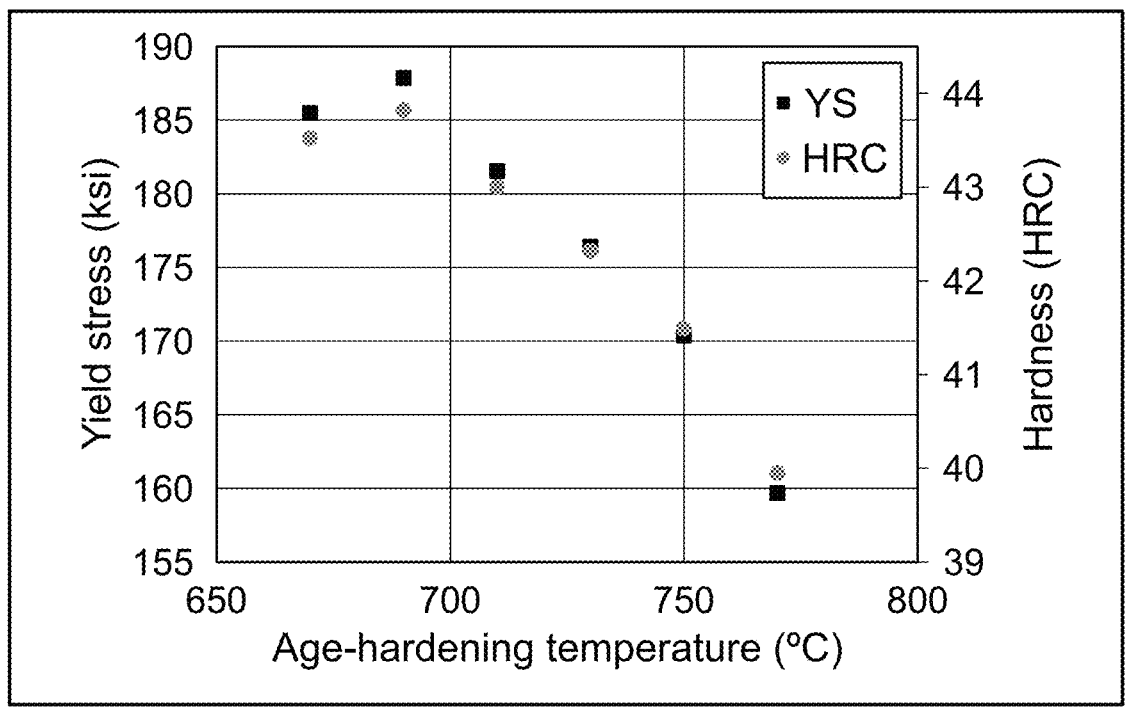
Figure 11D:
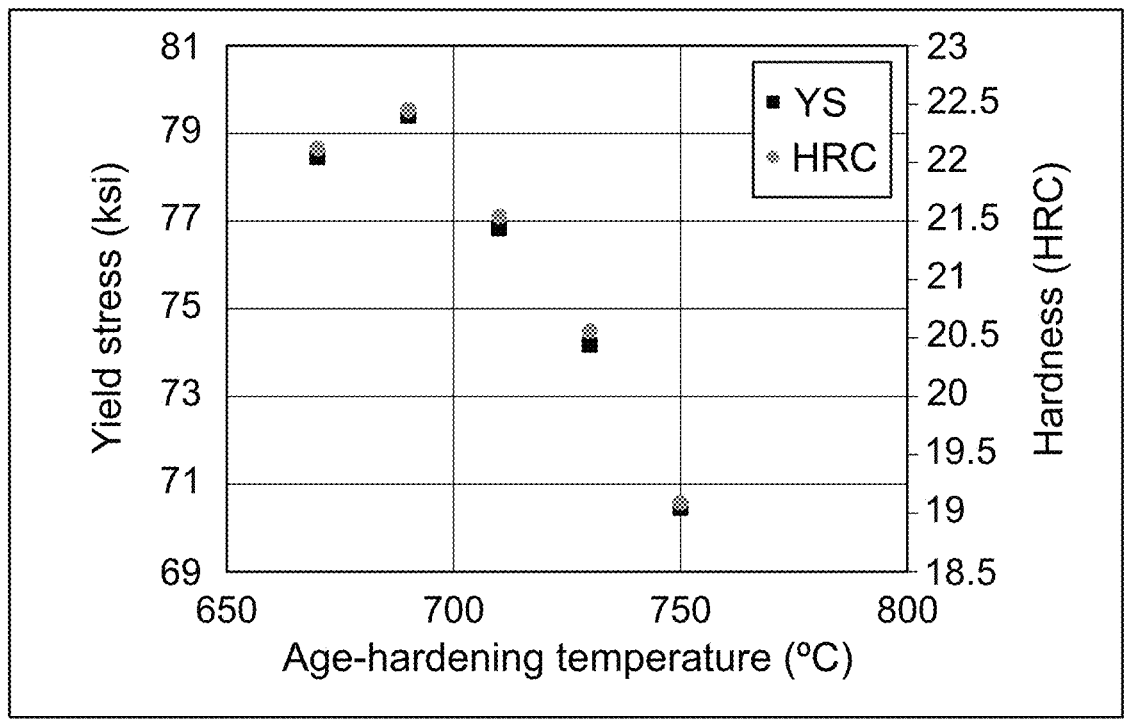
Figure 11E:
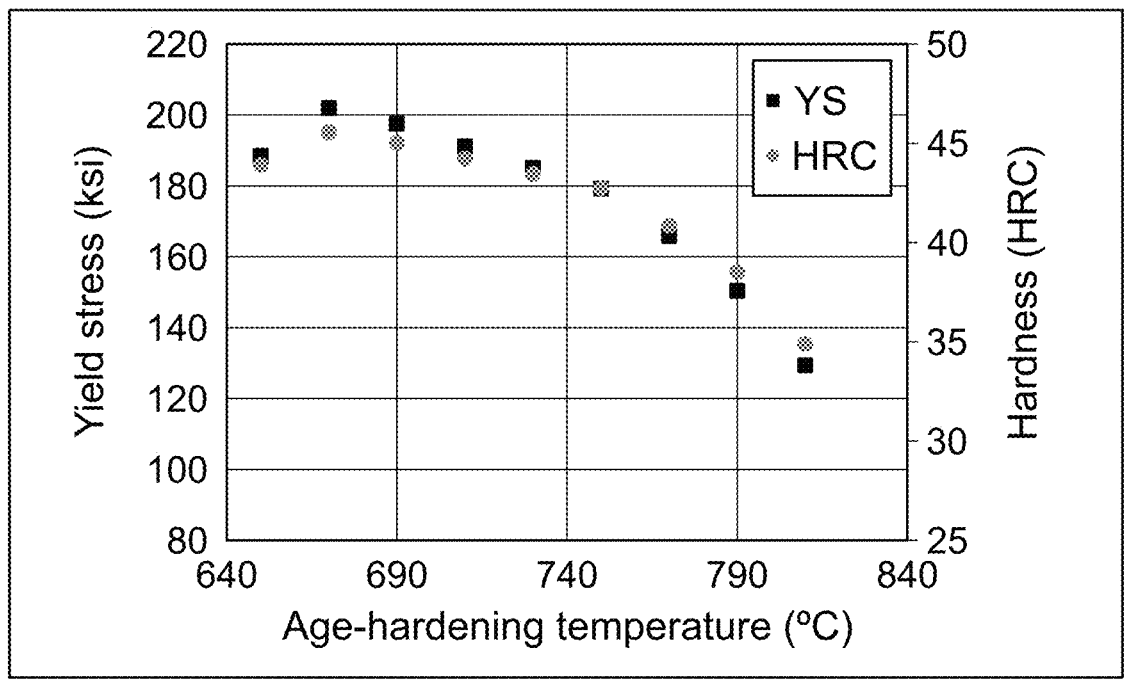
Figure 11F:
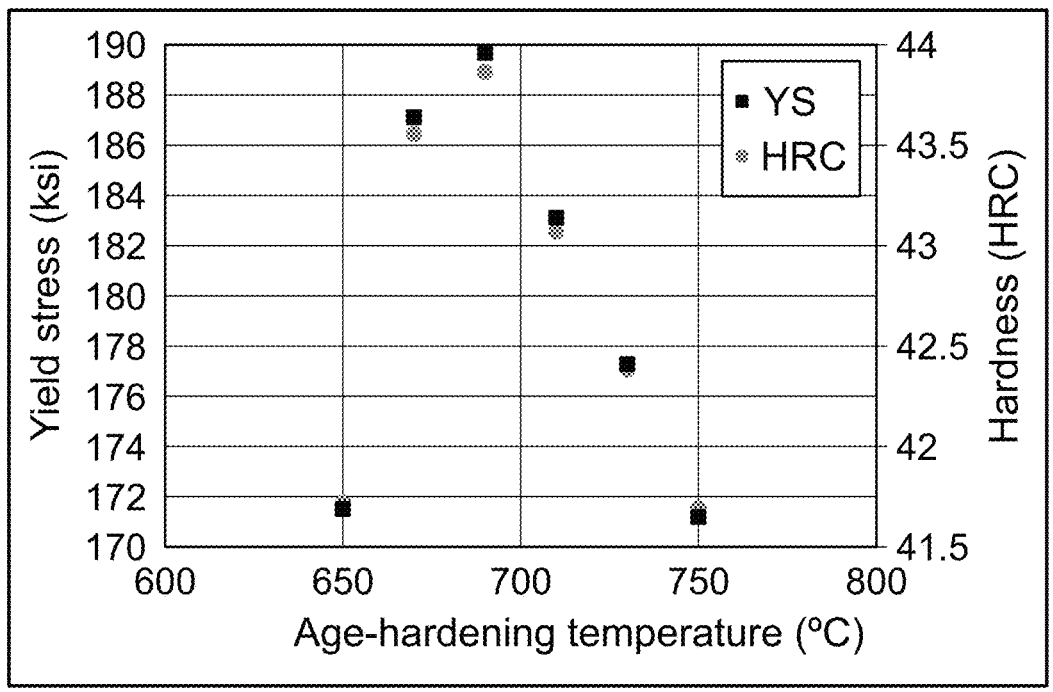
Figure 11G:
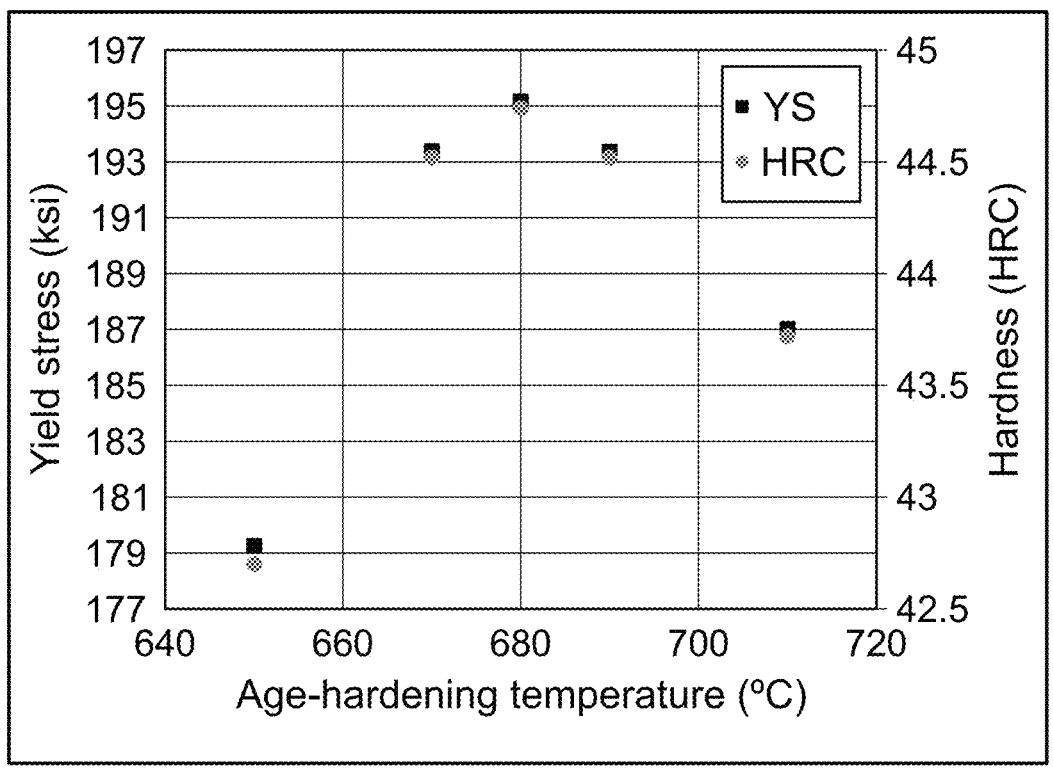
Figure 11H:
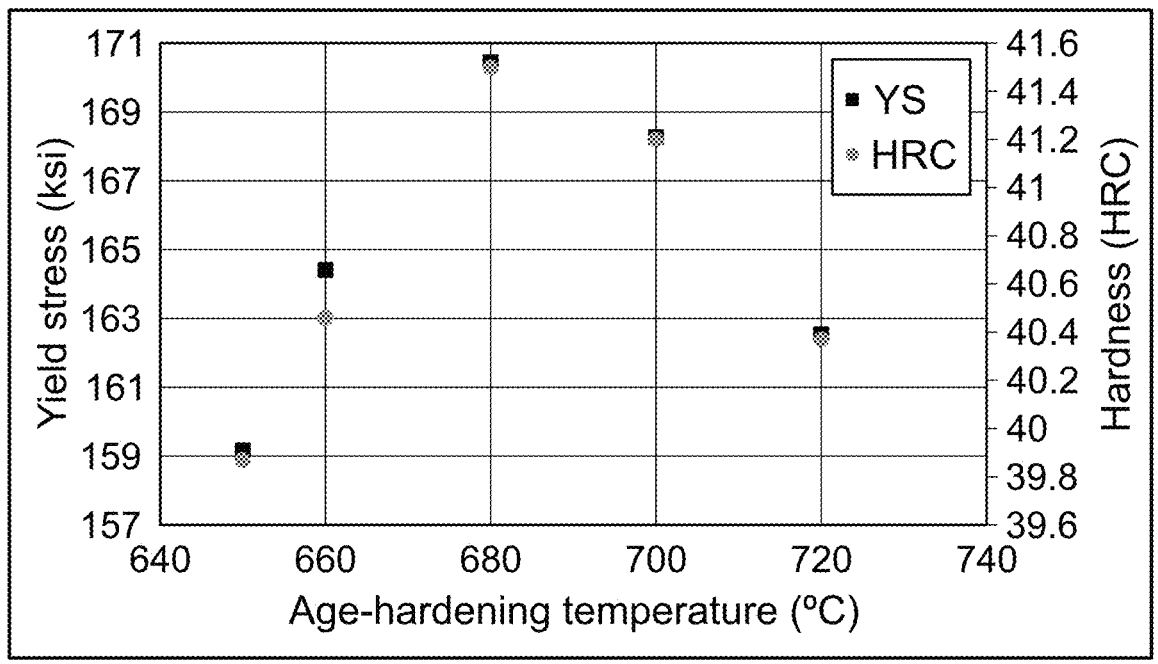
Figure 11I:
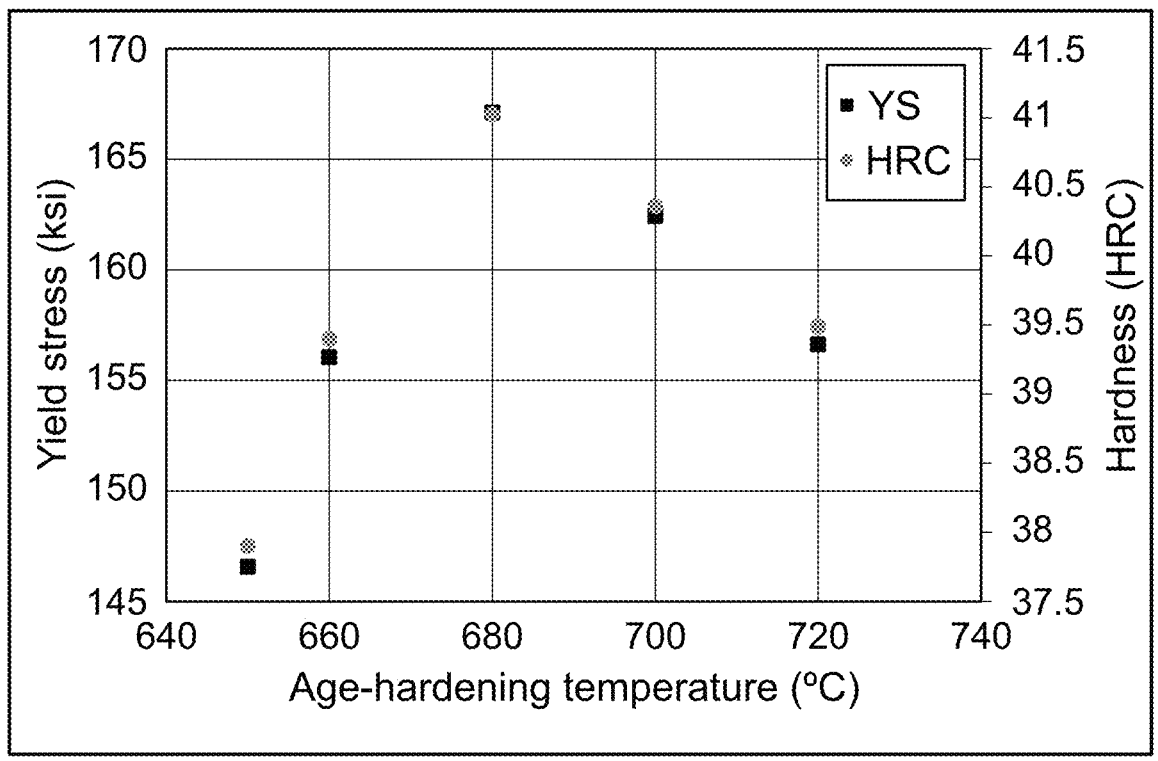
Figure 11J:
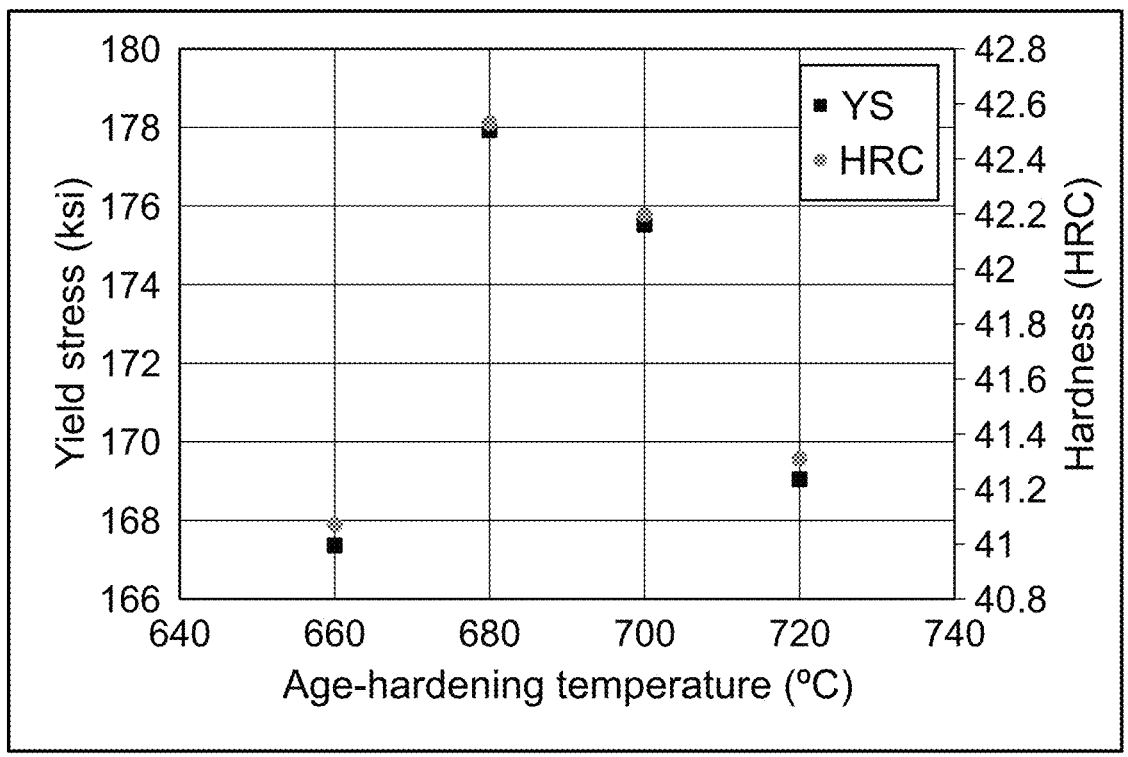
Figure 11K:
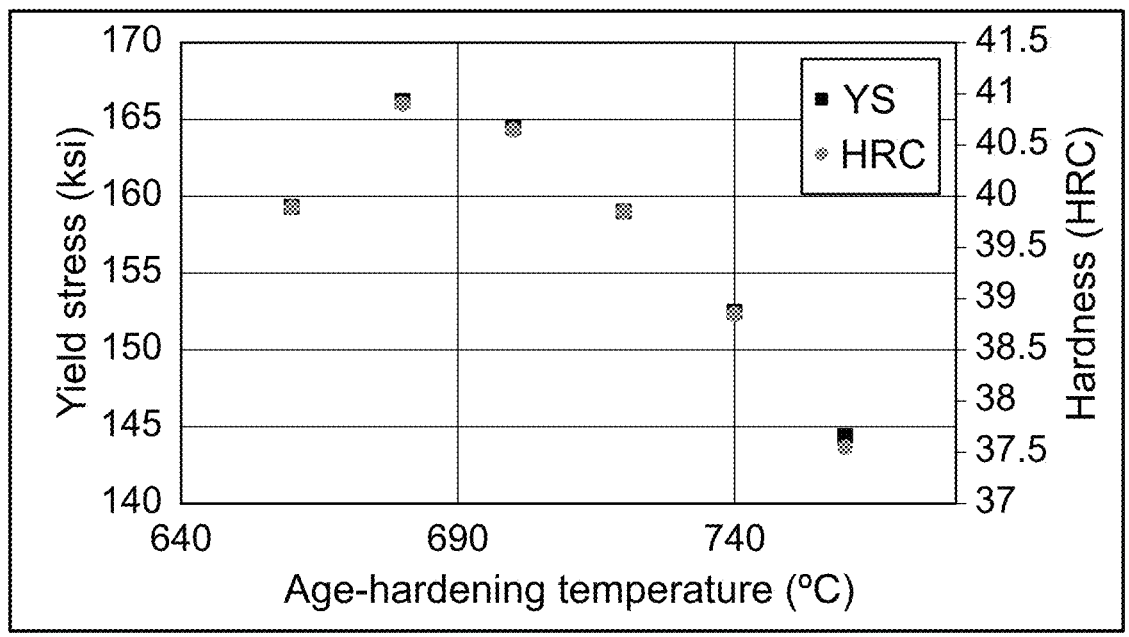
Figure 11L:
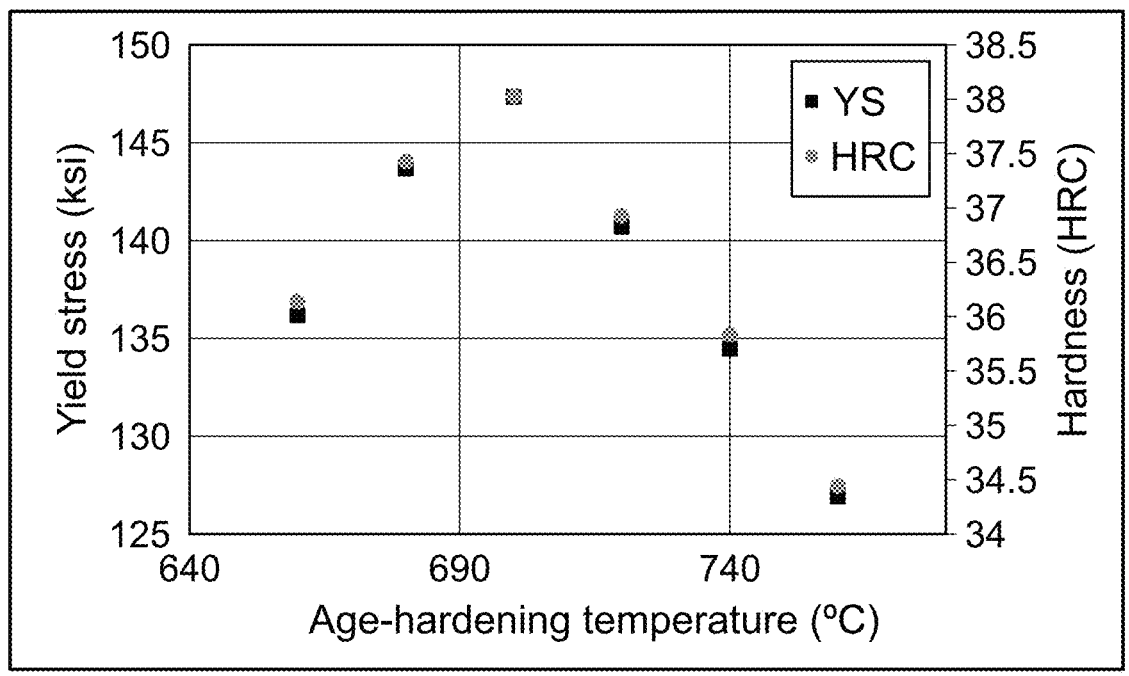
Figure 11M:
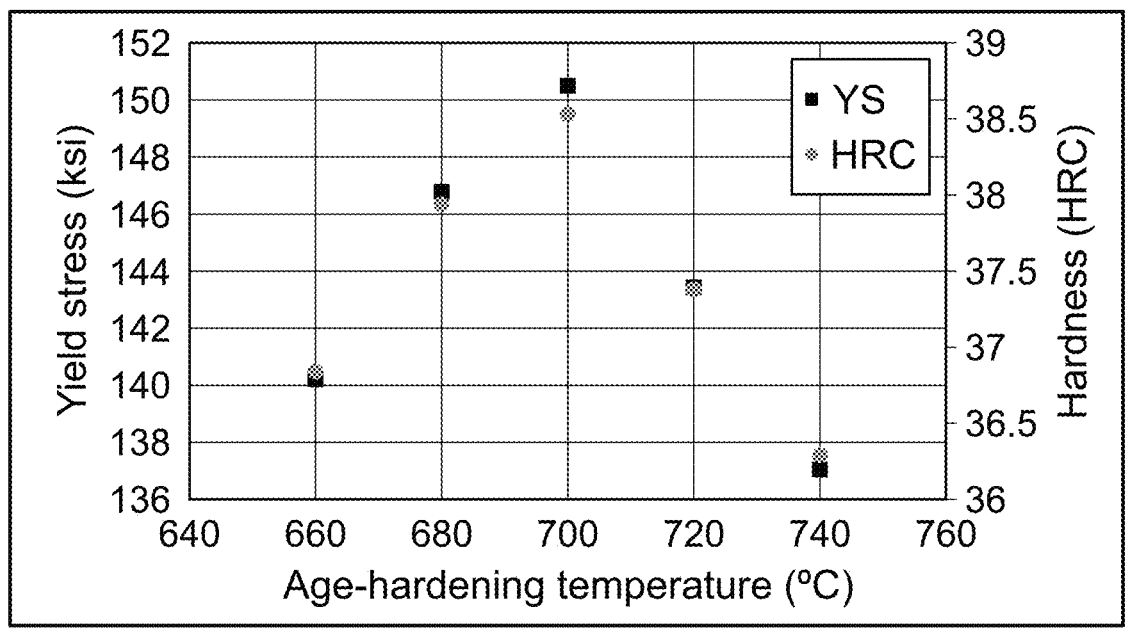
Figure 11N:
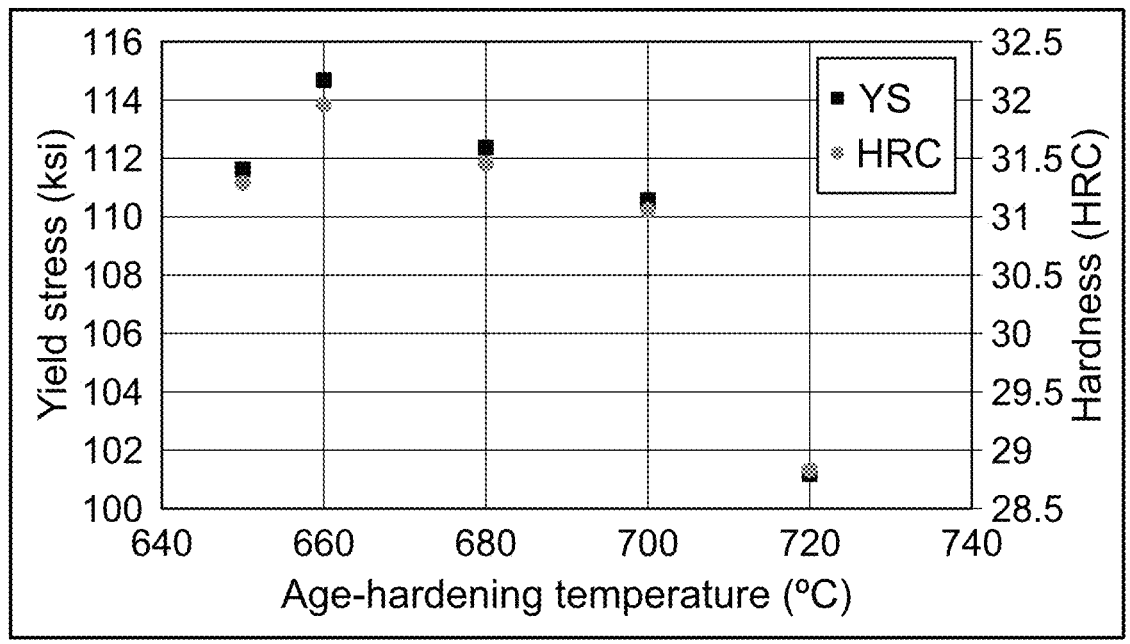
Figure 11O:
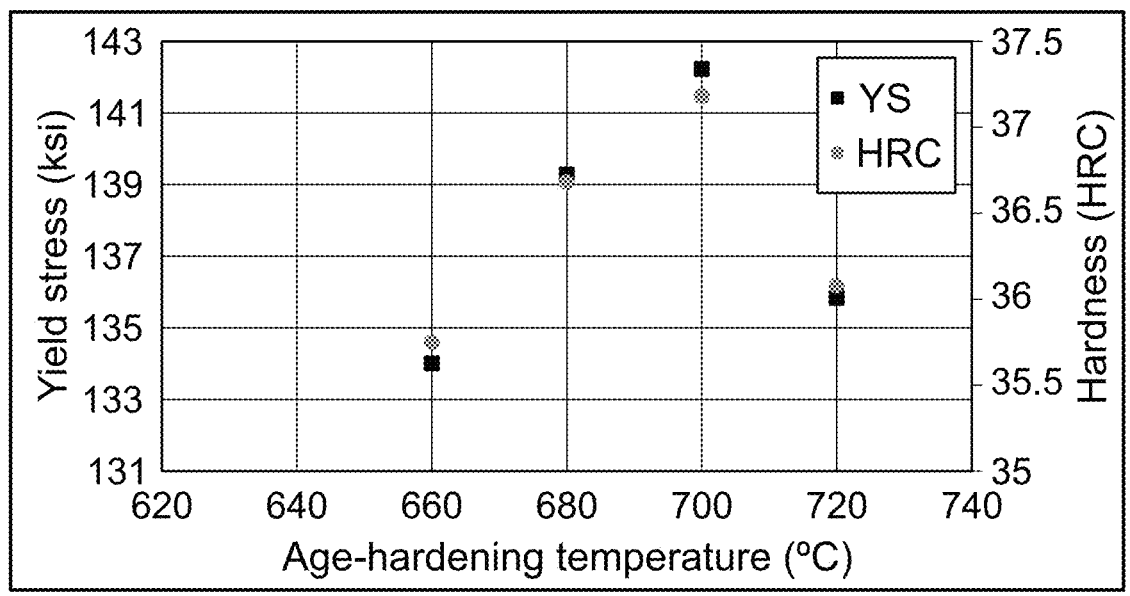
Figure 11P:
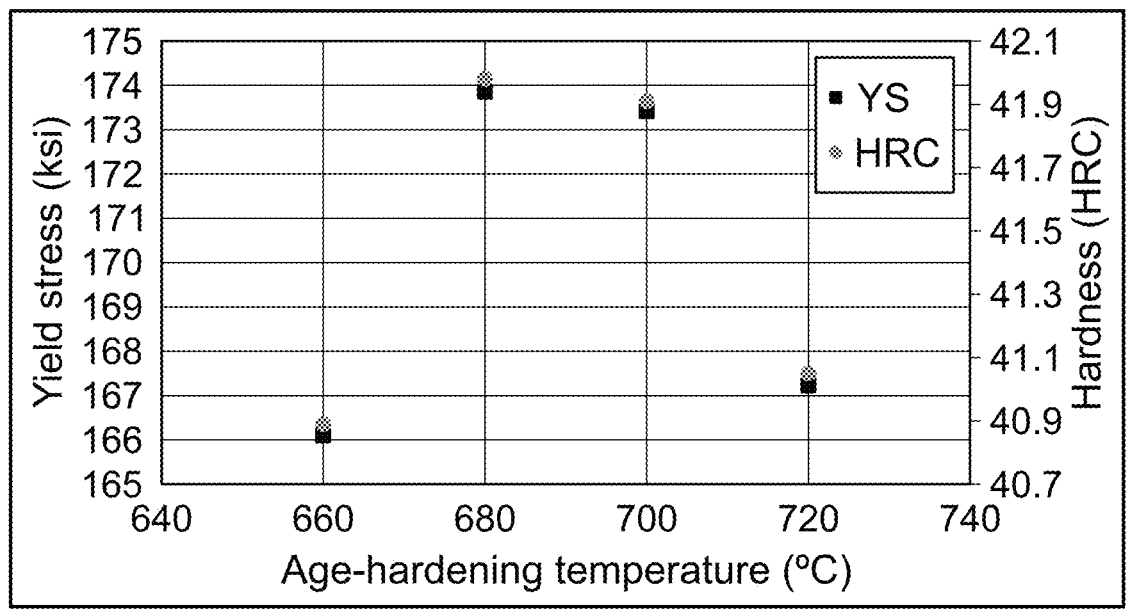
Figure 11R:
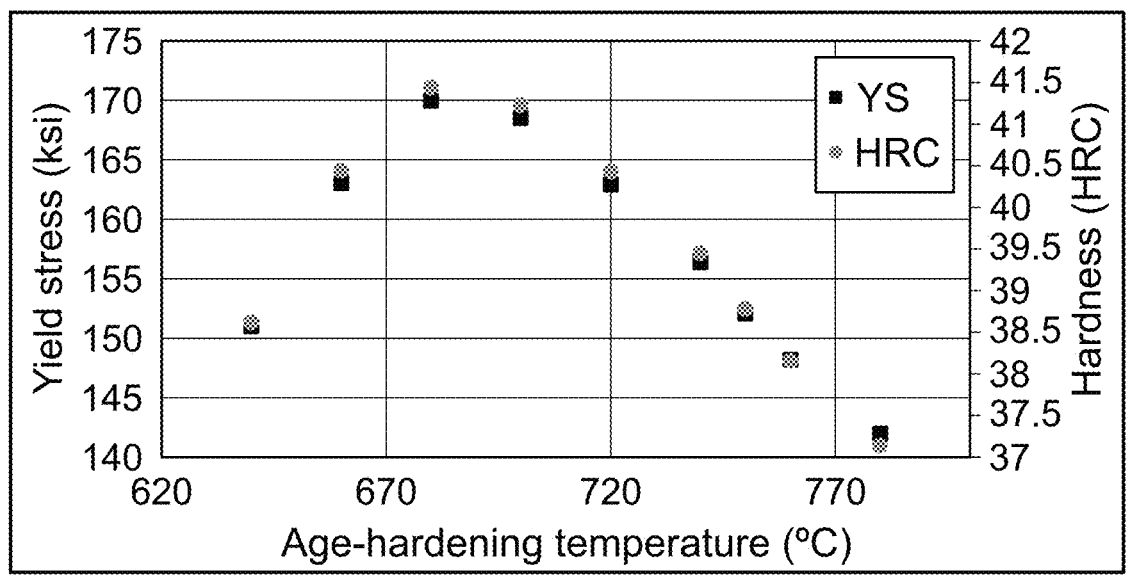
Figure 11S:
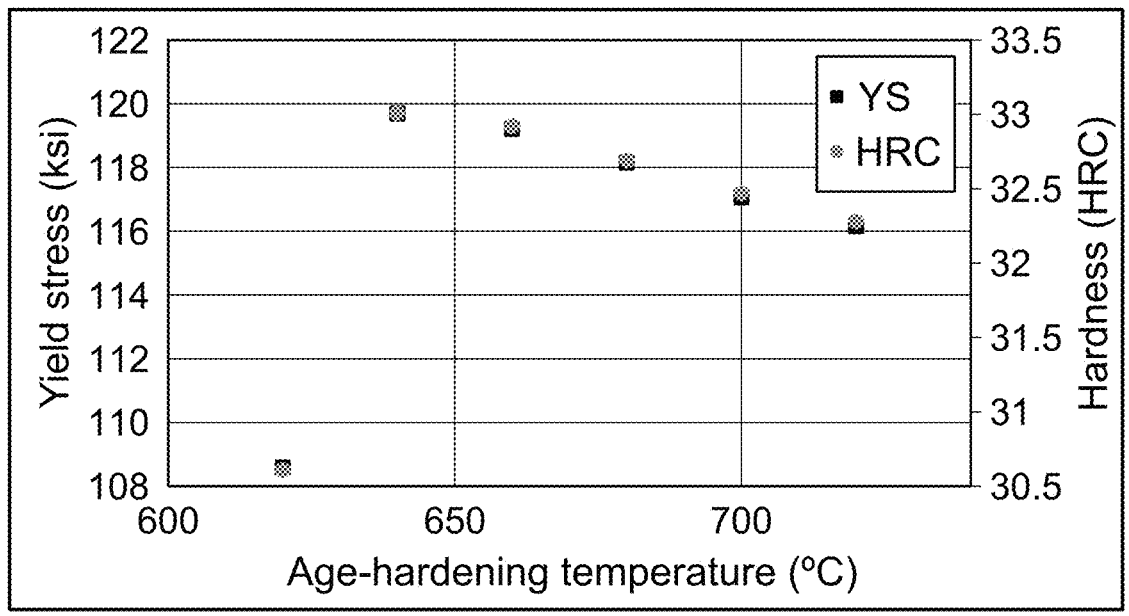
Figure 11T:
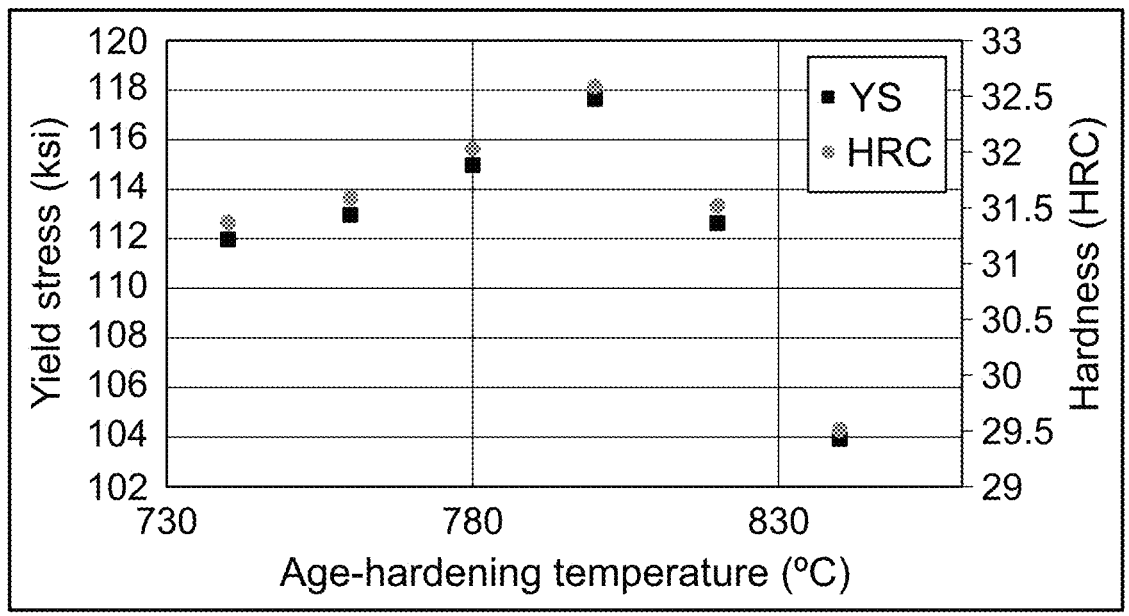
Figure 11U:
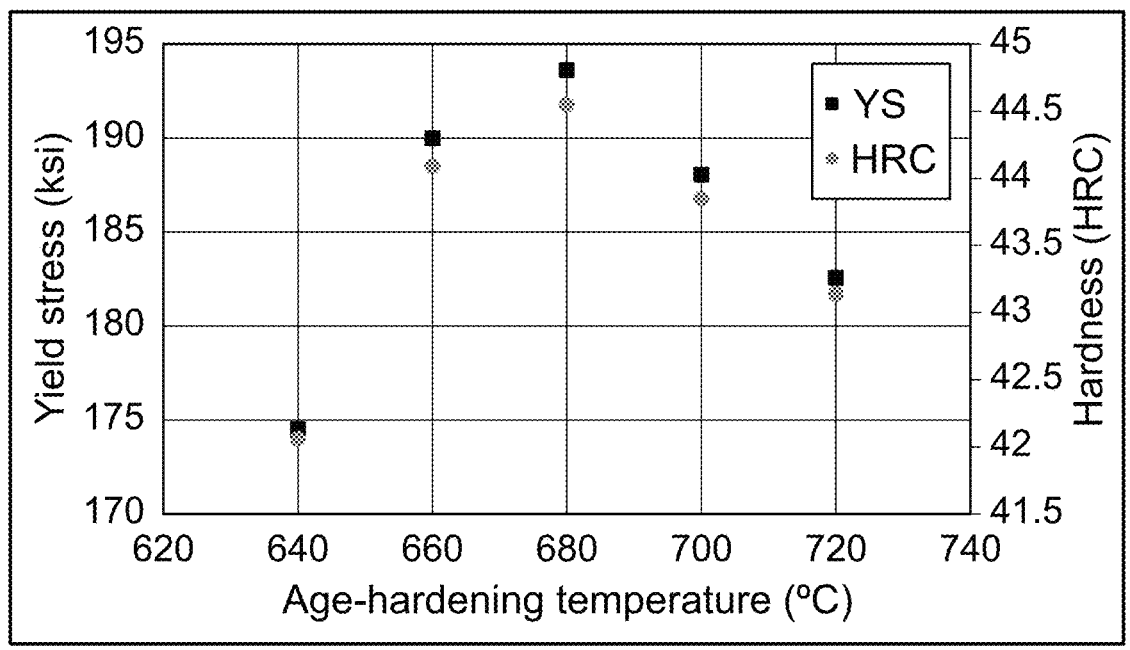
Figure 11V:
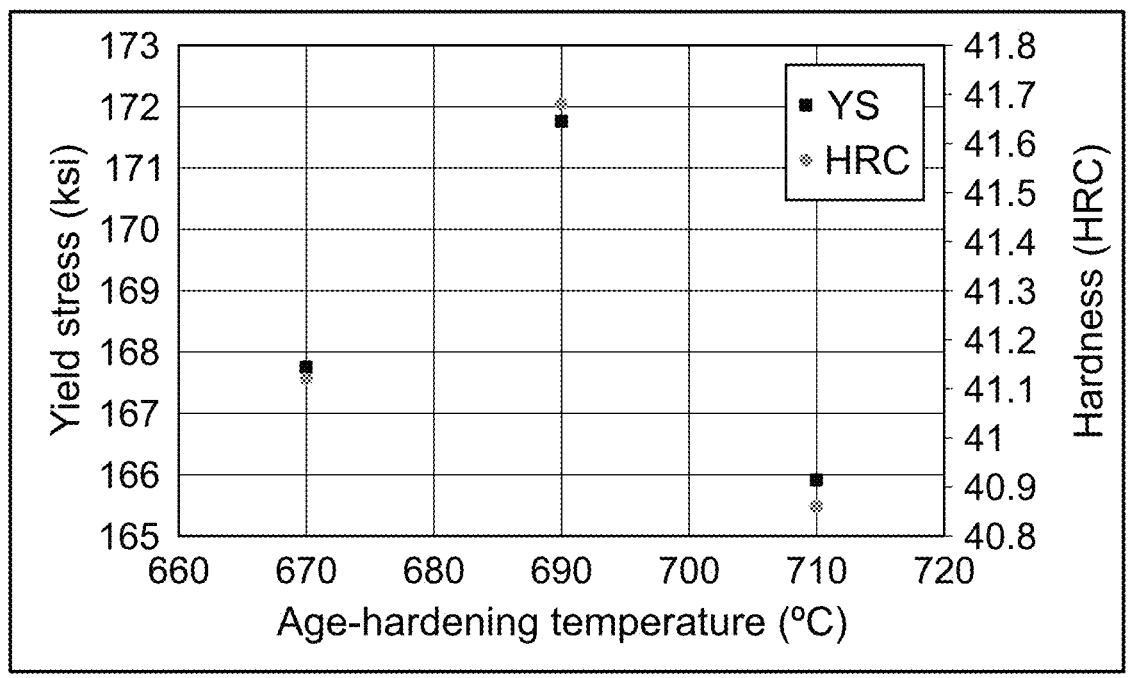
Figure 11X:
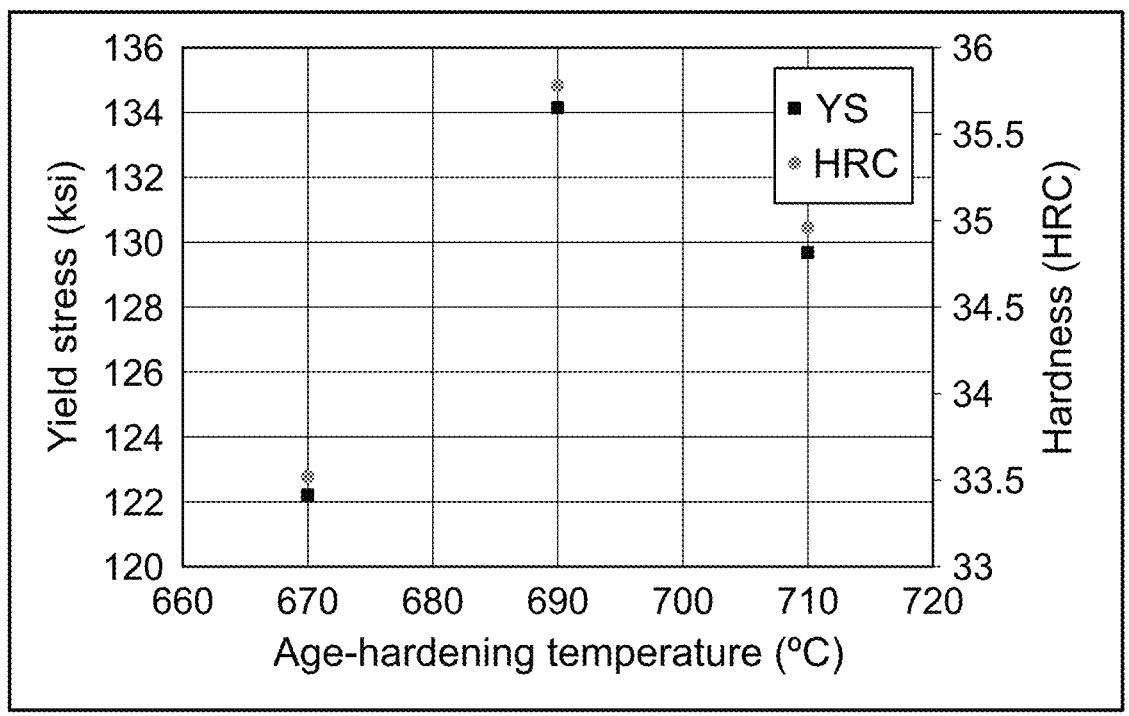
Figure 11Y:
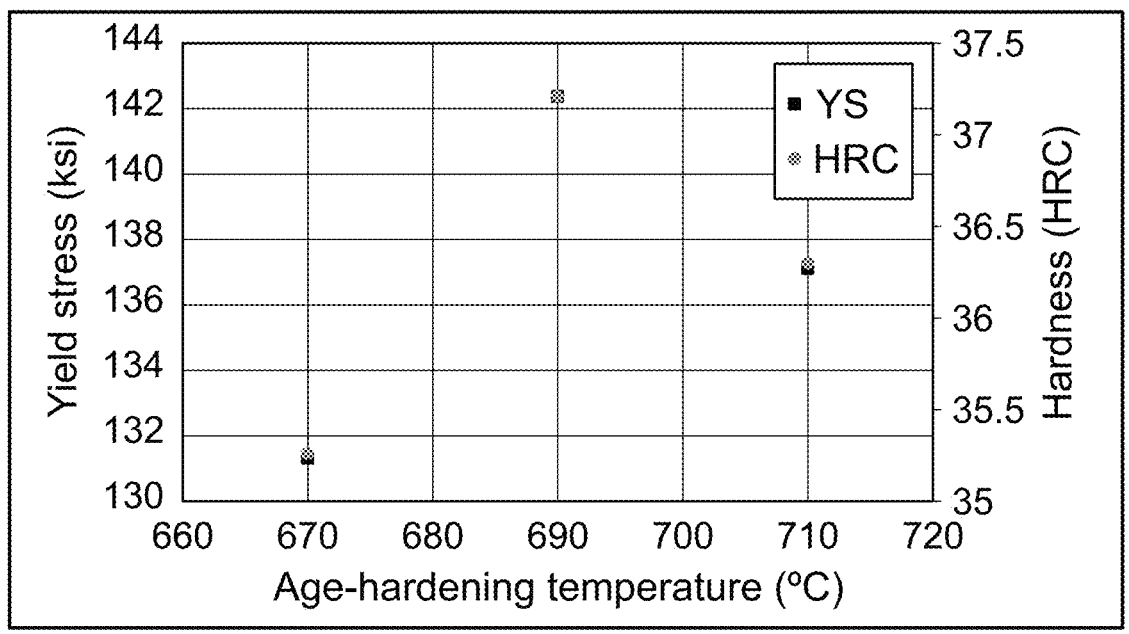
Figure 11Z:
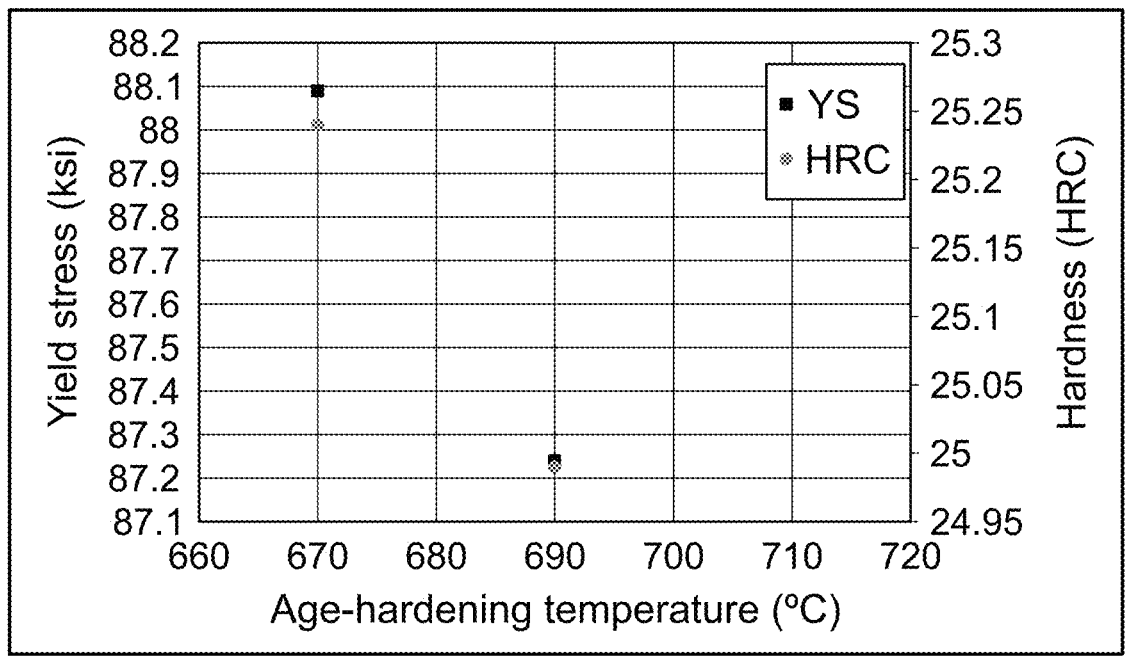
Figure 11A:
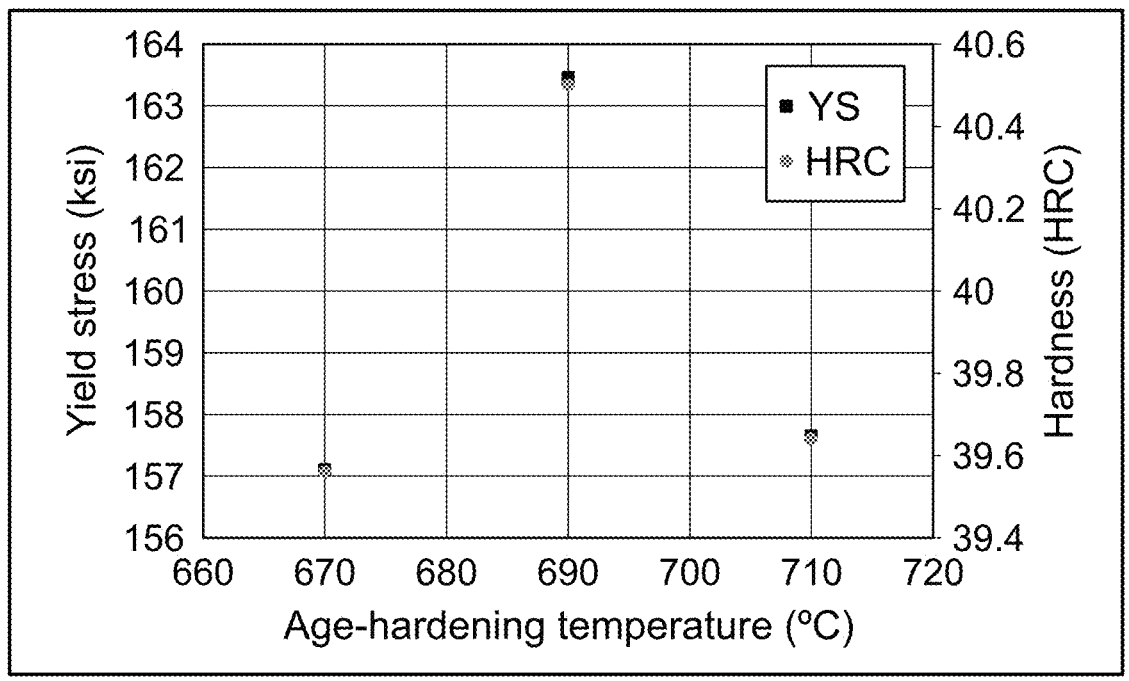
Figure 11A:
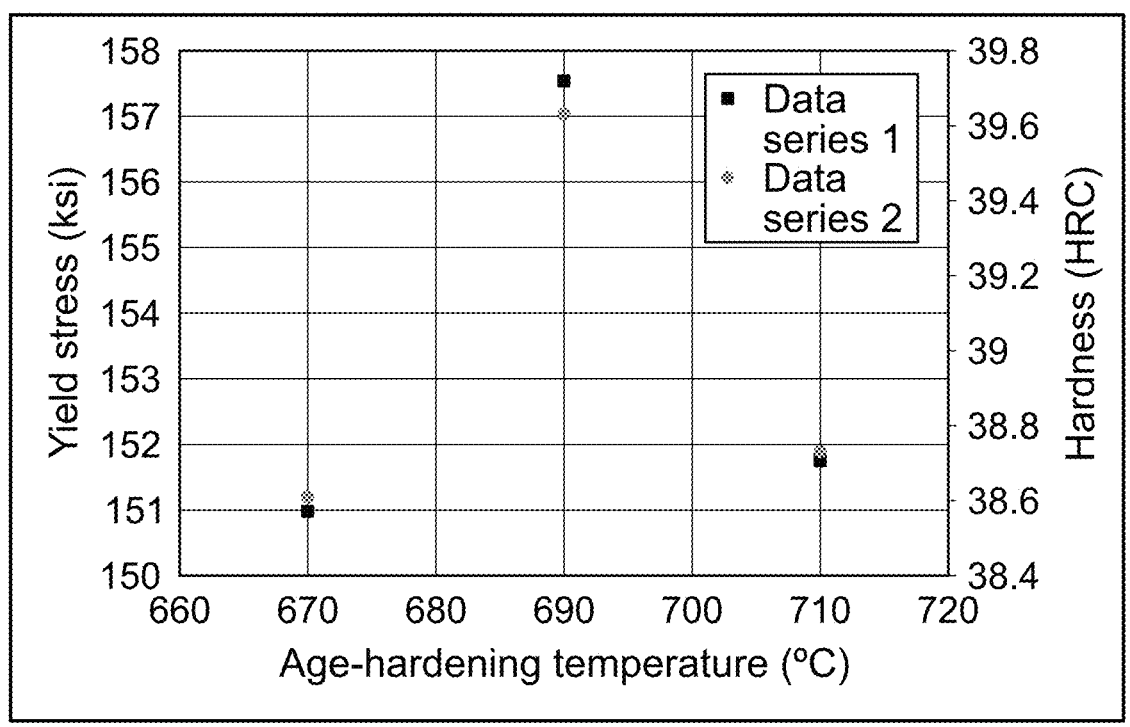

The invention claimed is:
1. A nickel alloy having (in wt %)

| | |
|---|---|
| Ni | 50-55% |
| Cr | 17-21% |
| Mo | >0-9% |
| W | 0-9% |
| Nb | 1-5.7% |
| Ta | >0-4.7% |
| Ti | 0.1-3.0% |
| Al | 0.4-4.0% |
| Co | max. 3.0% |
| Mn | max. 0.35% |
| Si | max. 0.35% |
| Cu | max. 0.23% |
| C | 0.001-0.045% |
| S | max. 0.01% |
| P | 0.001-0.02% |
| B | 0.001-0.01% |

Fe the rest and the usual process-related impurities, wherein the following relationships are fulfilled

| | | |
|---|---|---|
| Nb + Ta | 1-5.7% | (1) |
| Al + Ti | >1.2-5% | (2) |
| Mo + W | 3-9% | (3) | wherein Nb, Ta, Al and Ti are the concentrations of the elements in question in wt %.

2. The alloy according to claim 1, with a chromium content of 17 to 20%.

3. The alloy according to claim 1, wherein the relationship molybdenum plus tungsten is 3 to 8%.

4. The alloy according to claim 1, wherein the following relationship is fulfilled between niobium and tantalum:

Nb+Ta=2 to 4.5%, wherein Nb and Ta are the concentrations of the elements in question in mass %.

5. The alloy according to claim 1, with a titanium content of 0.5 to 2.0%.

6. The alloy according to claim 1, with an aluminum content of 0.6 to 2.5%.

7. The alloy according to claim 1, with a carbon content of 0.001 to max. 0.035%.

8. The alloy according to claim 1, wherein the following relationship is fulfilled between aluminum and titanium:

Al+Ti=1.4 to 4%, wherein Al and Ti are the concentrations of the elements in question in mass %.

9. A product made of the alloy according to claim 1, in the product form of bar, wire, strip, sheet, longitudinally welded pipe, seamless pipe, or powder.

10. A structural part made of the alloy according to claim 1 for use in the oil & gas industry or in the chemical process industry.

* * * * *